(12) United States Patent
Kawakatsu

(10) Patent No.: US 7,834,519 B2
(45) Date of Patent: Nov. 16, 2010

(54) METHOD AND DEVICE FOR PRECISELY RESISTING AND MOVING HIGH LOAD

(75) Inventor: Hideki Kawakatsu, Tokyo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 12/556,384

(22) Filed: Sep. 9, 2009

(65) Prior Publication Data

US 2010/0060105 A1    Mar. 11, 2010

Related U.S. Application Data

(62) Division of application No. 11/596,757, filed as application No. PCT/JP2005/009229 on May 20, 2005, now Pat. No. 7,622,847.

(30) Foreign Application Priority Data

May 20, 2004    (JP)    ............... 2004-150134

(51) Int. Cl.
*H01L 41/00*    (2006.01)
(52) U.S. Cl. ............... 310/333; 310/328; 367/69
(58) Field of Classification Search ........... 310/333, 310/328; 347/69
See application file for complete search history.

(56) References Cited

U.S. PATENT DOCUMENTS

| 4,928,030 | A | | 5/1990 | Culp | |
|---|---|---|---|---|---|
| 5,205,147 | A | * | 4/1993 | Wada et al. | ............... 72/429 |
| 5,247,222 | A | * | 9/1993 | Engle | ............... 310/328 |
| 6,313,567 | B1 | * | 11/2001 | Maltabes et al. | ............... 310/328 |
| 6,873,087 | B1 | | 3/2005 | Choi et al. | |
| 7,301,257 | B2 | * | 11/2007 | Hwang et al. | ............... 310/317 |
| 2003/0226976 | A1 | | 12/2003 | Tanaka | |
| 2004/0263025 | A1 | * | 12/2004 | Moler et al. | ............... 310/328 |
| 2007/0296308 | A1 | * | 12/2007 | Yamamoto | ............... 310/328 |

FOREIGN PATENT DOCUMENTS

| JP | 3 81119 | 12/1991 |
|---|---|---|
| JP | 2706534 | 1/1998 |
| JP | 11-143542 | 5/1999 |
| JP | 2002-272149 | 9/2002 |
| JP | 2003-134859 | 5/2003 |
| JP | 2003-243282 | 8/2003 |

* cited by examiner

*Primary Examiner*—Walter Benson
*Assistant Examiner*—Bryan P Gordon
(74) *Attorney, Agent, or Firm*—Oblon, Spivak, McClelland, Maier & Neustadt, L.L.P.

(57) ABSTRACT

A precise and high load resistance moving method to perform fine movement positioning of the moving body, by fixing a piezoelectric element which generates a shear deformation, to a bottom surface of a wedge-shaped moving element placed on a base, and deforming the piezoelectric element by driving the piezoelectric element with drive pulses to move the wedge-shaped moving element along a first axis in which the wedge-shaped moving element drives into or away from a moving body to move the moving body along a second axis in upward and downward direction relative to the base. Also, a precise and high load resistance moving device including a wedge-shaped moving element, a pulse source, and a moving body vertically movable in upward or downward direction relative to the base.

7 Claims, 18 Drawing Sheets

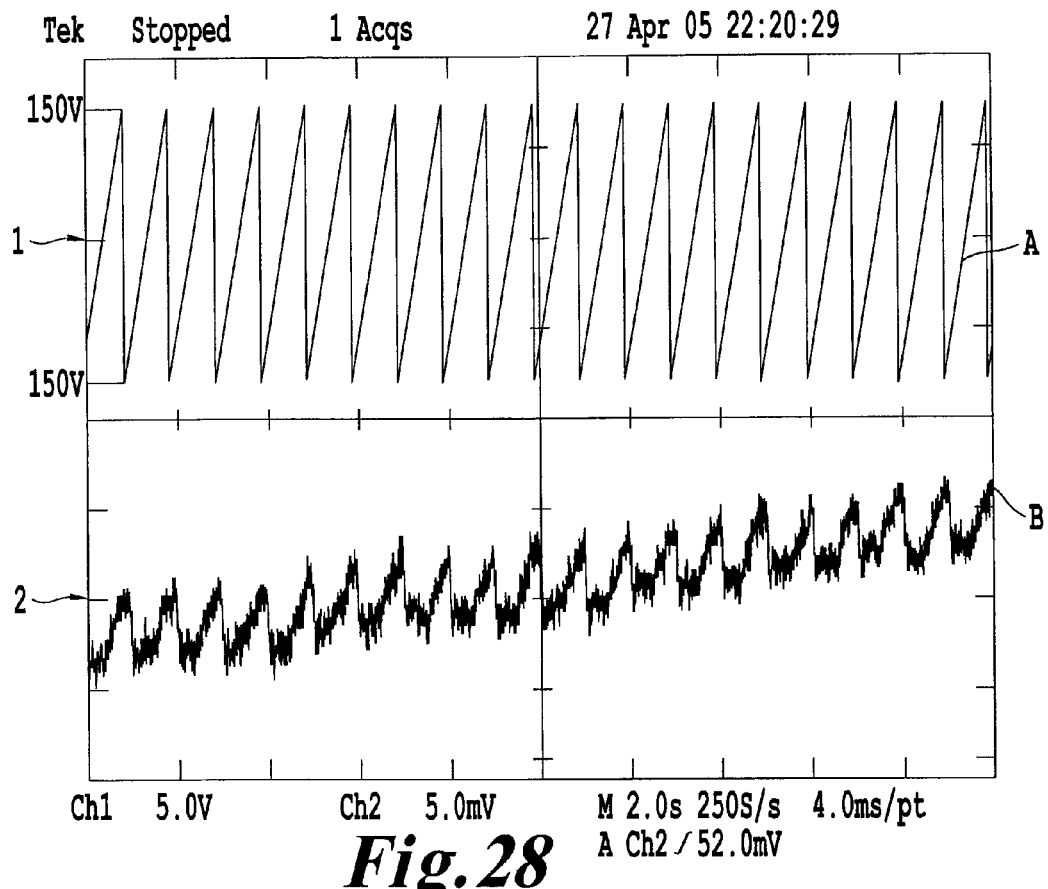
Fig. 28
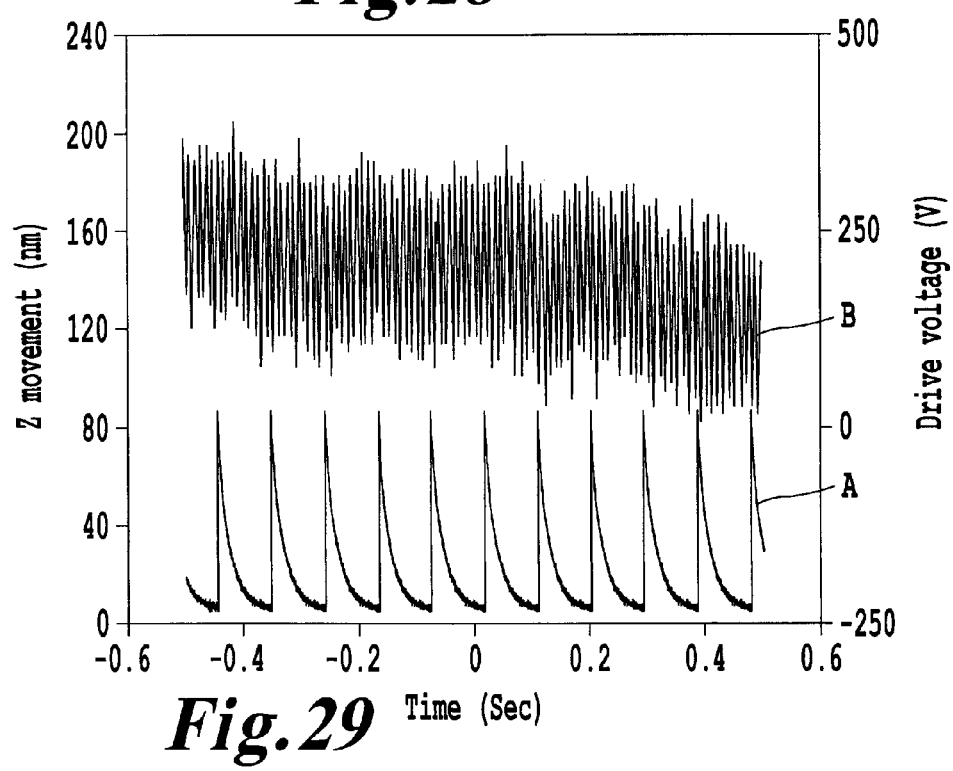
Fig. 29 Time (Sec)

METHOD AND DEVICE FOR PRECISELY RESISTING AND MOVING HIGH LOAD

CROSS-REFERENCE TO RELATED APPLICATIONS

This application is a divisional of, and claims the benefit of priority under 35 U.S.C. §120 from, U.S. Ser. No. 11/596,757, filed Sep. 19, 2007, the entire contents of which is incorporated herein by reference. U.S. Ser. No. 11/596,757 is in turn a National Stage of, and claims the benefit of priority from, Intl. Application No. PCT/JP05/09229, filed May 20, 2005, now U.S. Pat. No. 7,622,847, which is in turn based upon, and claims the benefit of priority from, Japanese Patent Application No. 2004-150134, filed May 20, 2004.

TECHNICAL FIELD

The present invention relates to a precise and high load resistance moving device, and more particularly, relates to a precise and high load resistance moving method and device suitable for a precise moving mechanism using a wedge and a piezoelectric element and a fine moving mechanism for a microscope.

BACKGROUND ART

FIG. 1 is a known positioning device of a stage as an impact driving mechanism by a rapid deformation of a piezoelectric element.

In the drawing, reference numeral 101 denotes a floor surface of a fixed part, reference numeral 102 denotes a wall surface of the fixed part, reference numeral 103 denotes a wedge-shaped moving body, reference numeral 104 denotes a piezoelectric element which is fixed to a side surface of the moving body 103, reference numeral 105 denotes an impact element which is fixed to a tip part of the piezoelectric element 104, reference numeral 106 denotes a stage which moves in a vertical direction by a movement of the wedge-shaped moving body 103, and reference numeral 107 denotes a guide of the moving body 103 by a spring. Although it is not shown in the drawing, to the piezoelectric element 104, a pulse voltage source which generates a rapid deformation of the piezoelectric element 104 is connected (see non-patent document 1 below).

Moreover, as the mechanism for moving a moving body by a rapid deformation of a shear piezoelectric element, the following mechanism is disclosed (see non-patent document 2).

FIG. 2 is a schematic view of such known mechanisms for moving the moving body by the rapid deformation of the shear piezoelectric element.

As illustrated in the drawing, conventionally, a piezoelectric element 202 which deforms in a shear direction is sandwiched between a main body 201 and a leg 203, and voltage of saw-tooth wave is applied to the piezoelectric element 202 to generate a movement.

Non-patent document 1: Tseng KuoHao, Shibuya Toshikatsu, Higuchi Toshiro, "Development of a Precise Position Adjuster Utilizing Piezo Actuator for Heavy Load" Proceedings of JSPE annual spring meeting 2002, pp 112.

Non-patent document 2: Ph. Niedermann, R. Emch, and P. Descouts, Rev. Sci. Instrum., 59, 368, (1988).

DISCLOSURE OF INVENTION

However, in the above-described known impact driving mechanism, impulse force is applied to the side surface of the moving body 103, and driving force which actually contributes to the movement of the moving body 103 is weak. Accordingly, while strong impulse force is required for the movement, the moving speed is slow and it is difficult to precisely adjust the moving body.

Moreover, in the above-described known mechanism for moving the moving body by the rapid deformation of the shearing piezoelectric element, the moving body is directly moved in the vertical direction by the rapid deformation of the shear piezoelectric element 202. However, there are disadvantages, for example, that a selection width of pressure to the sliding surface is narrow, the moving speed is slow, the load resistance is low, displacement after the positioning by the application of the force in the vertical direction, and it is not possible to maintain stable movement at several to ten nanometers.

In view of the above, it is an object of the present invention to provide a precise and high load resistance moving method and device in which a moving body can be precisely moved in a perpendicular direction, even when force is applied in a vertically downward direction, by using a piezoelectric element which generates a shear deformation, or, by combining the piezoelectric element which generates the shearing deformation and a piezoelectric element which generates a vertical deformation. Further, it is another object of the present invention to provide a precise and high load resistance moving method and device in which a moving body can be precisely moved in a perpendicular direction even when force is applied in a vertically downward direction, and positioning in xy directions or positioning of three degrees of freedom in xyz directions is possible, by arranging or layering a plurality of piezoelectric elements which generate shearing deformations so that their shearing directions differ.

To achieve the above objectives, the present invention provides the following:

[1] In a precise and high load resistance moving method, the method includes fixing a piezoelectric element which generates a shear deformation, to a bottom surface of a wedge-shaped moving element placed on a base, and moving the wedge-shaped moving element on the base by rapidly deforming and driving the piezoelectric element, and striking or extracting the wedge-shaped moving element to/from a moving body vertically movable in upward and downward direction to the base, whereby a fine movement positioning of the moving body is performed.

[2] In a precise and high load resistance moving method, the method includes fixing a layered piezoelectric element in which a piezoelectric element which generates a shear deformation and a piezoelectric element which generates a vertical deformation are bonded, to a bottom surface of a wedge-shaped moving element placed on a base, and moving the wedge-shaped moving element on the base by rapidly deforming and driving the layered piezoelectric element, and striking or extracting the wedge-shaped moving element to/from a moving body vertically movable in upward and downward direction to the base, whereby a fine movement positioning of the moving body is performed.

[3] In a precise and high load resistance moving method, the method includes fixing a first piezoelectric element which generates a shear deformation, to a bottom surface of a wedge-shaped moving element placed on a base, and fixing a second piezoelectric element which generates a shear deformation, along an upper inclined surface of the wedge-shaped moving element, and moving the wedge-shaped moving element on the base by rapidly deforming and driving the piezoelectric element, and striking or extracting the wedge-shaped moving element to/from a moving body vertically movable in upward and downward direction to the base, whereby a fine movement positioning of the moving body is performed.

[4] In a precise and high load resistance moving method, the method includes fixing a first piezoelectric element which generates a shear deformation, to a bottom surface of a wedge-shaped moving element placed on a base, and fixing a second piezoelectric element which generates a shear deformation in a depth direction of the page surface, to an upper inclined surface of the wedge-shaped moving element, moving the wedge-shaped moving element on the base by rapidly deforming and driving the first piezoelectric element, and striking or extracting the wedge-shaped moving element to/from a moving body movable in a vertical direction to the base and in a depth direction of the page surface, whereby a fine movement positioning of the moving body is performed, and, further, by rapidly deforming and driving the second piezoelectric element, a fine positioning of the moving body movable in the vertical direction to the base and in the depth direction of the page surface is performed in the depth direction of the page surface.

[5] In a precise and high load resistance moving method, the method includes fixing a layered piezoelectric element in which a piezoelectric element which generates a shear deformation and a piezoelectric element which generates a vertical deformation are bonded, to a bottom surface of a wedge-shaped moving element placed on a base, and fixing a layered piezoelectric element in which a piezoelectric element which generates a shear deformation along an inclined surface and a piezoelectric element which generates a shear deformation in a depth direction of the page surface are bonded, to an upper inclined surface of the wedge-shaped moving element, and moving the wedge-shaped moving element on the base by rapidly deforming and driving the piezoelectric element which generates the shear deformation along the inclined surface out of the layered piezoelectric element fixed to the bottom surface of the wedge-shaped moving element and the layered piezoelectric element fixed to the upper inclined surface, and striking or extracting the wedge-shaped moving element to/from a moving body vertically movable in upward and downward direction to the base, whereby a fine movement positioning of the moving body is performed, and, further, by rapidly deforming and driving the piezoelectric element which generates the shear deformation in the depth direction of the page surface out of the layered piezoelectric element fixed to the upper inclined surface, whereby a fine movement positioning of the moving body in the depth direction of the page surface is also performed.

[6] In a precise and high load resistance moving method, the method includes fixing a first piezoelectric element which generates a shear deformation, to a bottom surface of a wedge-shaped moving element which is placed on a base having wall surfaces to both sides and has a triangular shape having two inclined surfaces on the upper side in a cross section, and fixing second and third piezoelectric elements which generate shear deformations in a depth direction of the page surface, to each upper inclined surface of both sides of the wedge-shaped moving element, and moving the wedge-shaped moving element laterally on the base, by rapidly deforming and driving the first piezoelectric element, and striking or extracting the wedge-shaped moving element to/from two moving bodies movable in a vertical direction to the base and in a depth direction of the page surface, whereby a fine movement positioning of the moving bodies in the vertical direction is performed so that a total of potential energy of the two moving bodies in the vertical direction is not changed, and, by rapidly deforming and driving the second and third piezoelectric elements, a fine movement positioning of the moving bodies in the depth direction of the page surface is also performed.

[7] In a precise and high load resistance moving method, the method includes fixing a piezoelectric element which generates a shear deformation, to a bottom surface of a wedge-shaped moving element which is placed on a base having wall surfaces to both sides and has a triangular shape having two inclined surfaces on the upper side in a cross section, and fixing a layered piezoelectric element in which a piezoelectric element which generates a shear deformation along an inclined surface and a piezoelectric element which generates a shear deformation in a depth direction of the page surface are bonded, to each upper inclined surface of both sides of the wedge-shaped moving element, and moving the wedge-shaped moving element on the base by rapidly deforming and driving the piezoelectric element fixed to the bottom surface of the wedge-shaped moving element which is placed on the base and has the triangular shape having the two inclined surfaces on the upper side in the cross section, and the piezoelectric element which generates the shear deformation along the inclined surface, and striking or extracting the wedge-shaped moving element to/from two moving bodies movable in a vertical direction to the base and in a depth direction of the page surface, whereby a fine movement positioning of the moving bodies is performed so that a total of potential energy of the two moving bodies in the vertical direction is not changed, and, by rapidly deforming and driving the piezoelectric element arranged on the upper inclined surface and generates the shear deformation in the depth direction of the page surface, a fine movement positioning of the moving bodies in the depth direction of the page surface is also performed.

[8] In a precise and high load resistance moving method, a precise and high load resistance moving device in which a first piezoelectric element which generates a shear deformation is fixed to a bottom surface of a wedge-shaped moving element which is placed on a first base having wall surfaces to both sides and has a triangular shape having two inclined surfaces on the upper side in a cross section, second and third piezoelectric elements which generate shear deformations in a depth direction of the page surface is fixed to each upper inclined surface of both sides of the wedge-shaped moving element, the wedge-shaped moving element is laterally moved on the first base by rapidly deforming and driving the first piezoelectric element, and by striking or extracting the wedge-shaped moving element to/from two moving bodies movable in a vertical direction to the base and in a depth direction of the page surface, a fine movement positioning of the moving bodies is performed in the vertical direction so that a total of potential energy of the two moving bodies in the vertical direction is not changed, and, by rapidly deforming and driving the second and third piezoelectric elements, a fine movement positioning of the moving bodies in the depth direction of the page surface comprising placing the device on a second base through a fourth piezoelectric element which generates a shear deformation and which is fixed to a bottom surface of the first base, and moving the precise and high load resistance moving device on the second base in the horizontal direction by rapidly deforming and driving the fourth piezoelectric element, whereby a positioning of the moving bodies in xyz directions is performed.

[9] In the precise and high load resistance moving method described in [8], the second and third piezoelectric elements are layered piezoelectric elements in which a piezoelectric element which generates a shear deformation in an inclined surface direction and a piezoelectric element which generates a shear deformation in the depth direction of the page surface are bonded.

[10] In a precise and high load resistance moving method, the method includes a first wedge-shaped moving element arranged at a left side on a base and having a horizontal bottom surface and an inclined surface of which the inside is lower on an upper surface, and to the bottom surface, a first piezoelectric element formed of a piezoelectric element which generates a shear deformation is fixed, and to the inclined surface, a second piezoelectric element which generates a shear deformation in a depth direction of the page surface is fixed, and a second wedge-shaped moving element arranged at a right side on the base and having a horizontal bottom surface and an inclined surface of which the inside is lower on an upper surface, and to the bottom surface, a third piezoelectric element formed of a piezoelectric element which generates a shear deformation is fixed, and to the inclined surface, a fourth piezoelectric element which generates a shear deformation in a depth direction of the page surface is fixed, and a moving body which is arranged to be bridged by the first wedge-shaped moving element and the second wedge-shaped moving element, by rapidly deforming and driving the first and third piezoelectric elements, the first and second wedge-shaped moving elements are moved on the base, and a fine movement positioning of the moving body vertically movable in upward and downward direction is performed in lateral and vertical directions of the page surface, and by rapidly deforming and driving the second and fourth piezoelectric elements, a fine movement positioning of the moving body in the depth direction of the page surface is also performed.

[11] In the precise and high load resistance moving method described in [10], by forming the second and fourth piezoelectric elements by a layered piezoelectric element in which a piezoelectric element which generates a shear deformation in the inclined surface direction and a piezoelectric element which generates a shear deformation in the depth direction of the page surface are bonded, a fine movement positioning in xyz three directions is possible.

[12] In a precise and high load resistance moving device, the device includes a wedge-shaped moving element arranged on a surface in a horizontal direction of a fixed body, and to a bottom surface, a piezoelectric element which generates a shear deformation is fixed, a pulse source for rapidly deforming and driving the piezoelectric element, and a moving body vertically movable in upward and downward direction to the surface in the horizontal direction of the fixed body by a drive of the wedge-shaped moving element, and by striking or extracting the wedge-shaped moving element to/from the moving body, a movement positioning of the moving body is performed.

[13] In the precise and high load resistance moving device described in [12], the piezoelectric element is a layered piezoelectric element in which a piezoelectric element which generates a shear deformation and a piezoelectric element which generates a vertical deformation are bonded.

[14] In the precise and high load resistance moving device described in [12], further, a second piezoelectric element is fixed on an upper surface of the wedge-shaped moving element.

[15] In the precise and high load resistance moving device described in [14], the second piezoelectric element is a layered piezoelectric element.

[16] In the precise and high load resistance moving device described in [15], the second layered piezoelectric element is layers of a piezoelectric element which shears in an inclined surface direction and a piezoelectric element which sears in a depth direction of the page surface.

[17] In the precise and high load resistance moving device described in [15], the second layered piezoelectric element is layers of a piezoelectric element which shears in an inclined surface direction and a piezoelectric element which extends and contracts in a normal line direction of the inclined surface.

[18] In the precise and high load resistance moving device described in [12], further, a third piezoelectric element is fixed to a surface of the moving body which contacts a wall surface side of the fixed body.

[19] In the precise and high load resistance moving device described in [13], further, a third layered piezoelectric element is fixed to a surface of the moving body which contacts a wall surface side of the fixed body.

[20] In the precise and high load resistance moving device described in [14], the second piezoelectric element is a piezoelectric element which generates a shear deformation in a depth direction of the page surface.

[21] In the precise and high load resistance moving device described in [14], the second piezoelectric element is a layered piezoelectric element in which a piezoelectric element which generates a shear deformation in an inclined surface direction and a piezoelectric element which generates a shear deformation in a depth direction of the page surface are bonded.

[22] In a precise and high load resistance moving device, the device includes a first piezoelectric element which generates a shear deformation is provided to a bottom surface of a wedge-shaped moving element which is placed on a base having wall surfaces to both sides and has a triangular shape in a cross section, a second and third piezoelectric element which generate shear deformations in a depth direction of the page surface which are provided to each upper inclined surface of both sides of the wedge-shaped moving element, and means in which by rapidly deforming and driving the first piezoelectric element, the wedge-shaped moving element is moved on the base, and by striking or extracting the wedge-shaped moving element to/from moving body vertically movable in the vertical direction to the base, a fine movement positioning of moving bodies in the vertical directions is performed, and includes means in which by rapidly deforming and driving the second and third piezoelectric elements, a fine movement positioning of the moving body in the depth direction of the page surface is also performed.

[23] In the precise and high load resistance moving device described in [22], the second and third piezoelectric elements is a layered piezoelectric element in which a piezoelectric element which generates a shear deformation in an inclined surface direction and a piezoelectric element which generates a shear deformation in a depth direction of the page surface are bonded.

[24] In a precise high load resistance moving device, the device includes a first wedge-shaped moving element arranged at a left side on a base and having a horizontal bottom surface and an inclined surface of which the inside is lower on an upper surface, and to the bottom surface, a first piezoelectric element formed of a piezoelectric element which generates a shear deformation is fixed, and to the inclined surface, a second piezoelectric element which generates a shear deformation in a depth direction of the page surface is fixed, and a second wedge-shaped moving element arranged at a right side on the base and having a horizontal bottom surface and an inclined surface of which the inside is lower on an upper surface, and to the bottom surface, a third piezoelectric element formed of a piezoelectric element which generates a shear deformation is fixed, and to the inclined surface, a fourth piezoelectric element which generates a shear deformation in the depth direction of the page surface is fixed, the device further includes means in which a moving body is arranged to be bridged by the first wedge-shaped moving element and the second wedge-shaped moving element, by rapidly deforming and driving the piezoelectric elements, the first and second wedge-shaped moving elements are moved on the base, and a fine movement positioning in the page surface lateral direction and the vertical direction of the moving body movable in the vertical direction and in the depth direction of the page surface is performed so that a total of potential energy of the two moving bodies in the vertical direction is not changed, and means in which by rapidly deforming and driving the piezoelectric elements which generate the shear deformations in the depth direction of the page space, a fine movement positioning of the moving body in the depth direction of the page surface is also performed.

[25] In the precise and high load resistance moving device described in [24], the second and fourth piezoelectric elements are layered piezoelectric elements in which a piezoelectric element which generates a shear deformation in an inclined surface direction and a piezoelectric element which generates a shear deformation in a depth direction of the page surface are bonded.

[26] In the precise and high load resistance moving device described in [24], the second and fourth piezoelectric elements are layered piezoelectric elements in which a piezoelectric element which generates a shear deformation and a piezoelectric element which generates a vertical deformation are bonded.

BRIEF DESCRIPTION OF THE DRAWINGS

FIG. 28 is a view (5) in which displacements of a moving element of a precise and high load resistance moving device of the present invention in a vertical direction is measured.

FIG. 29 is a view (6) in which displacements of a moving element of a precise and high load resistance moving device of the present invention in a vertical direction is measured.

BEST MODE FOR CARRYING OUT THE INVENTION

By combining a piezoelectric element which generates a shear deformation, or a layered piezoelectric element in which a piezoelectric element which generates a shear deformation and a piezoelectric element which generates a vertical deformation are combined, with a wedge-shaped moving element, it is possible to move even when pressure is applied to a large sliding surface. In addition, by adjusting each phase of the piezoelectric element which displaces in vertical and horizontal directions, a high-speed moving mechanism as a bidirectional ultrasonic motor can be realized.

Especially, when the piezoelectric element which generates the vertical deformation is bonded to the piezoelectric element which generates the shear deformation, and both piezoelectric elements are driven simultaneously, or with a certain phase difference, a high load resistance and robustness against a state of the surface can be obtained.

Moreover, by using a plurality of the piezoelectric elements which generate the shear deformations and varying shearing directions of the shearing deformation piezoelectric elements, a moving mechanism movable in two axes or three axes directions can be realized.

Embodiments

Hereinafter, embodiments of the present invention will be described in detail.

Figure 1:
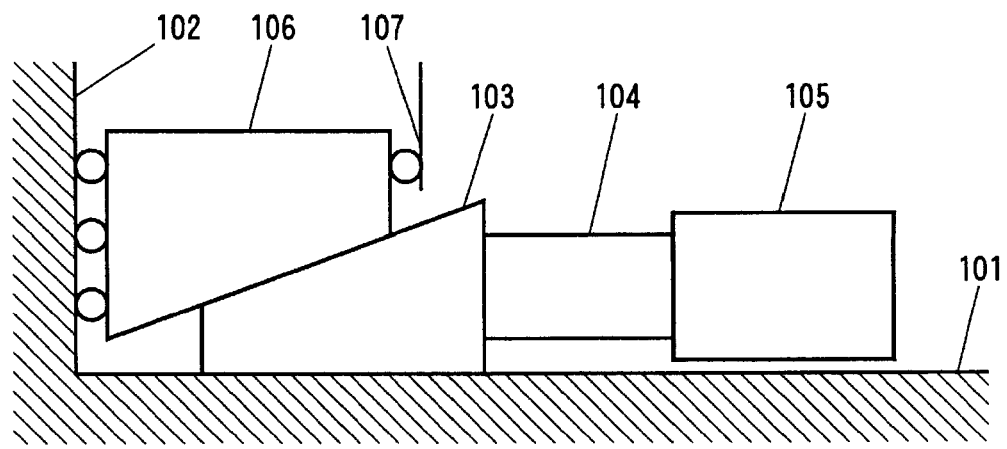
FIG. 1 illustrates a known positioning device of a stage as an impact driving mechanism by a rapid deformation of a piezoelectric element.
Figure 2:
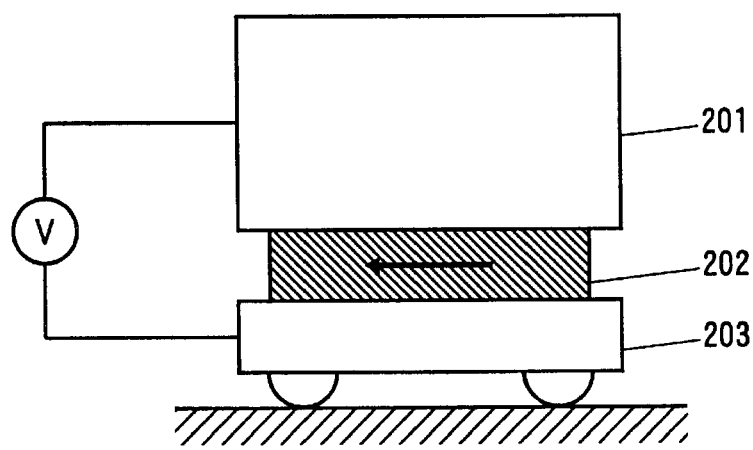
FIG. 2 is a schematic view of a known mechanism for moving a moving body by a rapid deformation of a shearing piezoelectric element.
Figure 3:
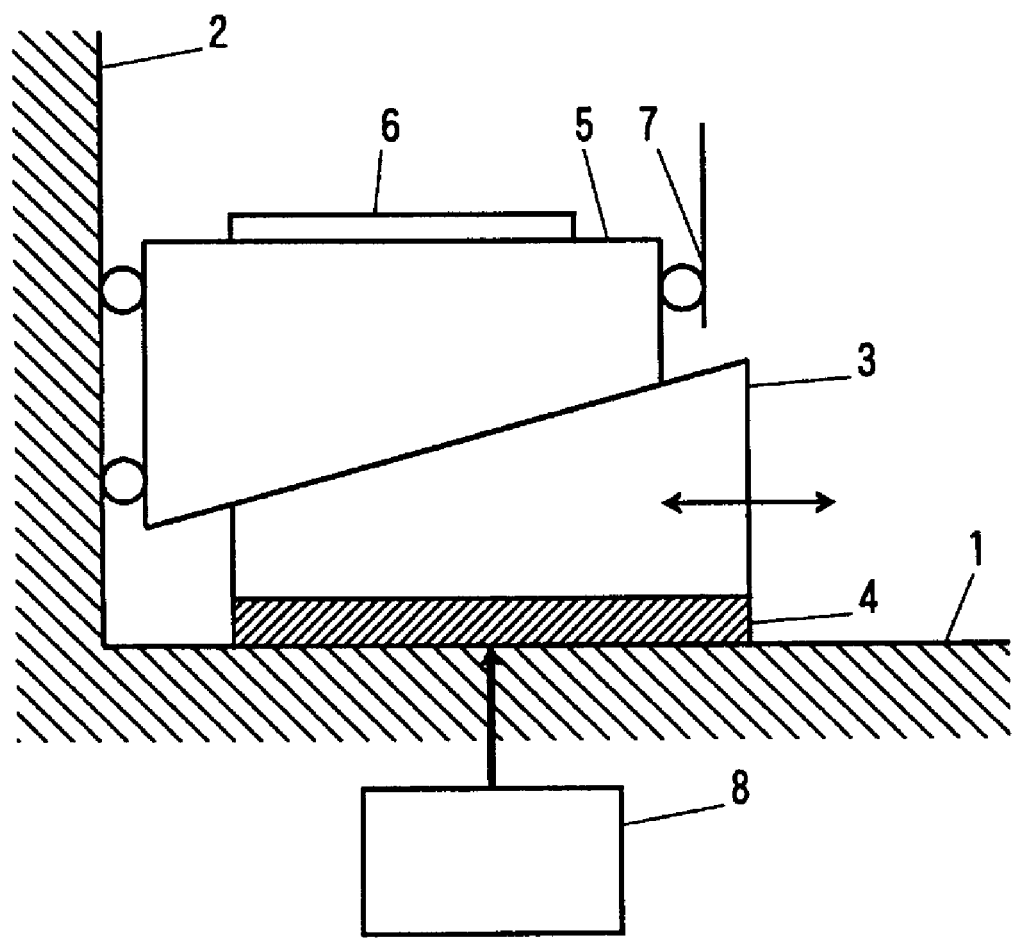
FIG. 3 is a schematic view of a precise and high load resistance moving device illustrating a first embodiment of the present invention.

FIG. 3 is a schematic view of a precise and high load resistance moving device illustrating a first embodiment of the present invention.

In the drawing, reference numeral 1 denotes a floor surface of a fixed part, reference numeral 2 denotes a wall surface of the fixed part, reference numeral 3 denotes a wedge-shaped moving element, reference numeral 4 denotes a piezoelectric element which is fixed to a bottom surface of the wedge-shaped moving element 3 and generates a shear deformation, reference numeral 5 denotes a moving body which is driven by the wedge-shaped moving element 3 and moves in a perpendicular direction, and on an upper surface of the moving body 5, a sample 6, for example, is placed. Reference numeral 7 denotes a guide (bearing) which holds the moving body 5 with a spring, and reference numeral 8 denotes a drive pulse source for generating a rapid deformation to the piezoelectric element 4 which generates a shear deformation.

If the piezoelectric element 4 which generates the shear deformation is rapidly deformed by a pulse from the drive pulse source 8, the wedge-shaped moving element 3 finely moves in a horizontal direction (here, leftward direction). Then, the wedge-shaped moving element 3 is struck to the moving body 5, and the moving body 5 moves upward (or alternately, by extracting, the moving body 5 can be moved downward), and thus, a fine movement positioning of the moving body 5 in the vertical direction can be performed.

Figure 4:
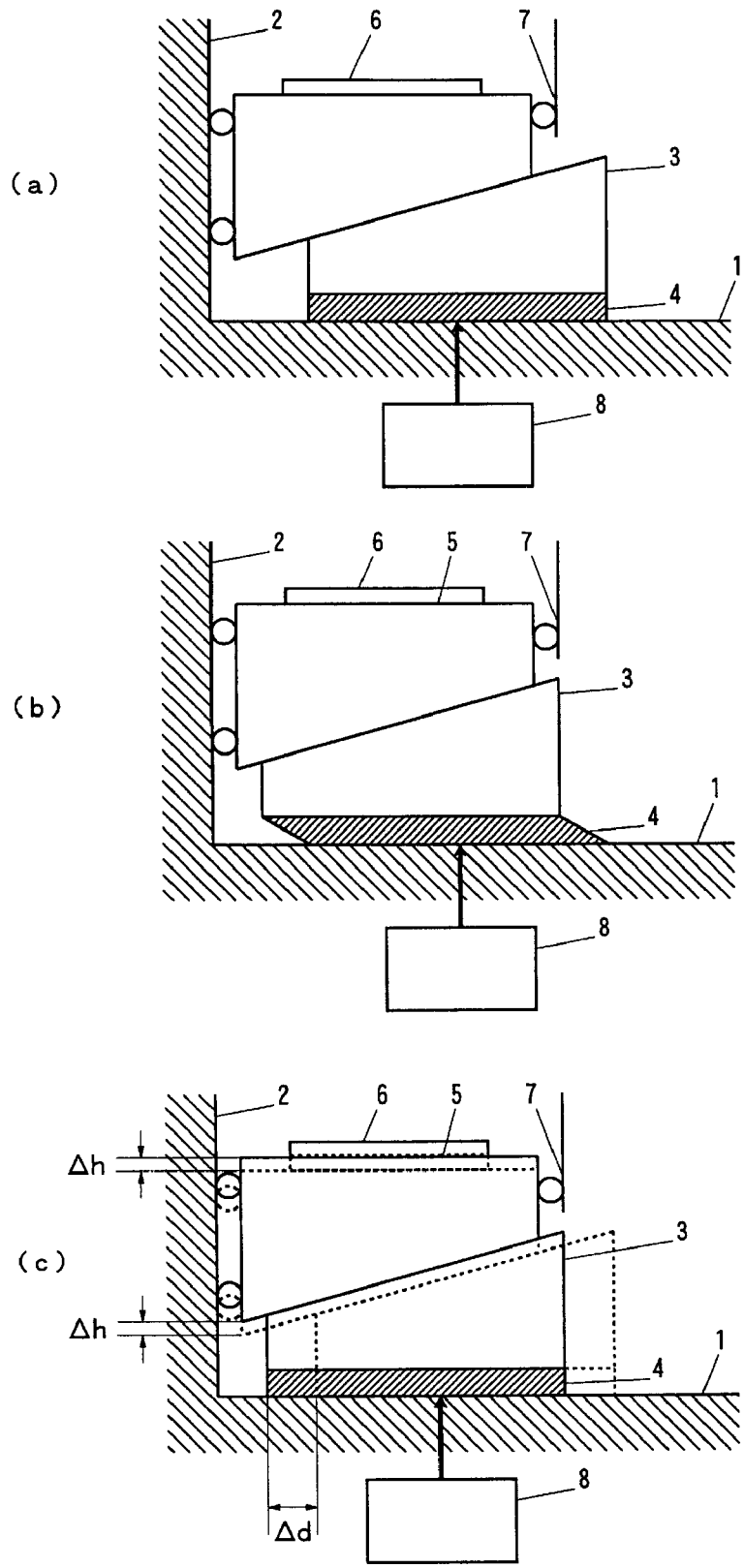
FIG. 4 is a schematic view illustrating operation of the precise and high load resistance moving device illustrating the first embodiment of the present invention.
Figure 5:
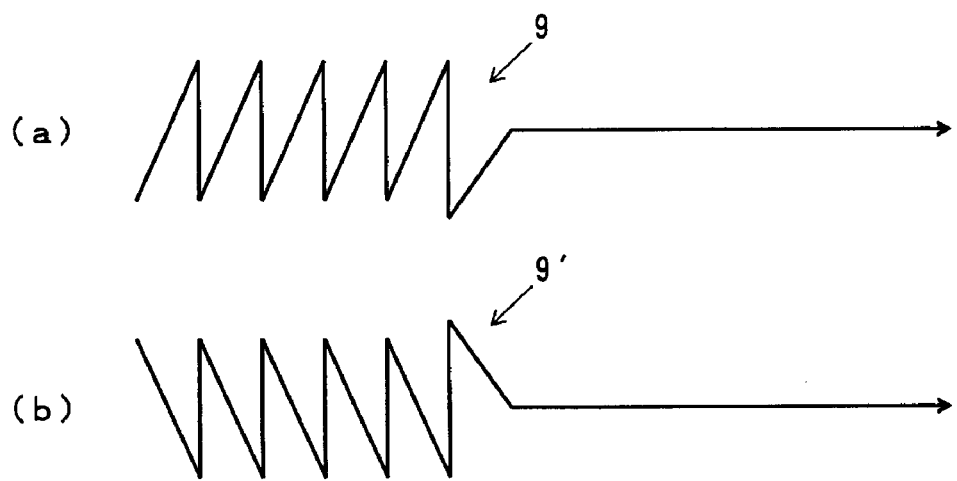
FIG. 5 is a schematic view illustrating an example of drive pulses of the precise and high load resistance moving device illustrating the first embodiment of the present invention.

FIG. 4 is a schematic view illustrating operation of the precise and high load resistance moving device illustrating the first embodiment of the present invention, and FIG. 5 is a schematic view illustrating an example of the drive pulse.

First, the wedge-shaped moving element 3 is located at a position illustrated in FIG. 4(a), and to the bottom surface of the wedge-shaped moving element 3, the piezoelectric element 4 which generates the shear deformation is fixed.

Then, to the piezoelectric element 4 which generates the shear deformation, when saw-shaped drive pulses 9 and 9' illustrated in FIG. 5 are applied from the drive pulse source 8, the piezoelectric element 4 rapidly deforms in the leftward direction as illustrated in FIG. 4(b). That is, as illustrated in FIG. 4(c), the piezoelectric element 4 moves leftward by Δd, and the wedge-shaped moving element 3 is struck under the moving body 5 from the right-hand side, and thus, the moving body 5 is lifted up vertically upward by Δh and positioned.

Figure 6:
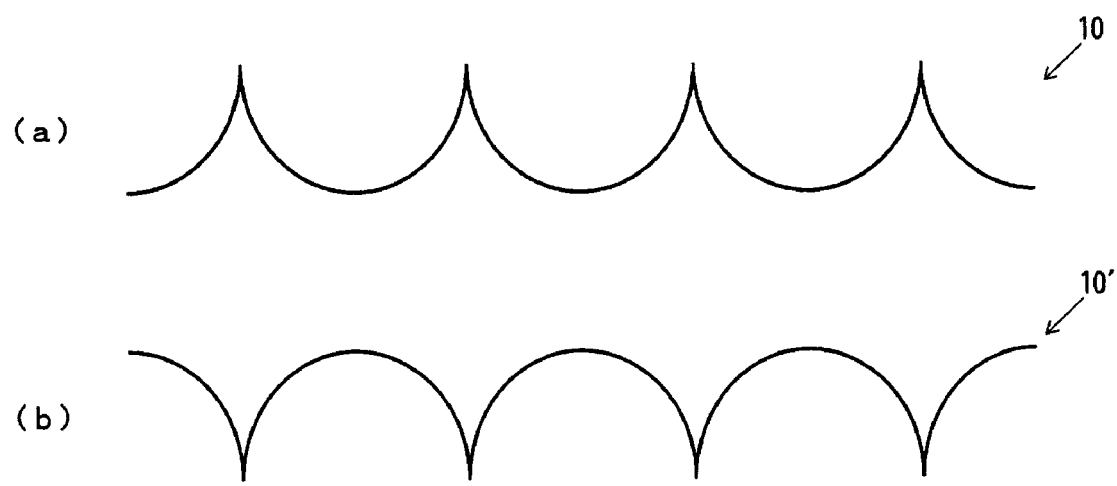
FIG. 6 is a schematic view illustrating another example of drive pulses of the precise and high load resistance moving device illustrating the first embodiment of the present invention.

In this embodiment, the example in which the saw-shaped pulses illustrated in FIG. 5 are applied as the drive pulses is described. Alternatively, as illustrated in FIG. 6, drive pulses 10 and 10' which have a mountain shape (an inclination becomes sharp as it comes to a top and the summit is not flat) with the upward tops and downward tops can be applied.

Figure 7:
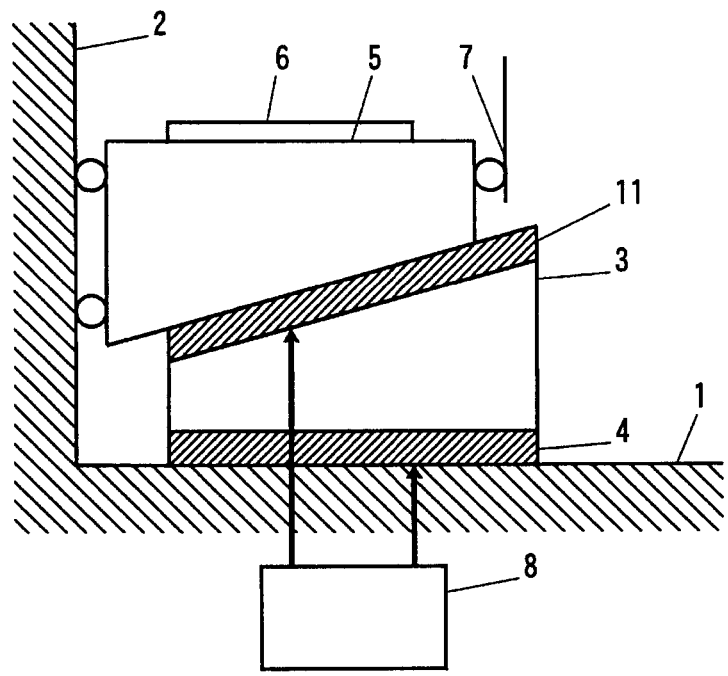
FIG. 7 is a schematic view of a precise and high load resistance moving device illustrating a second embodiment of the present invention.

FIG. 7 is a schematic view of a precise and high load resistance moving device illustrating a second embodiment of the present invention.

In this embodiment, further, a piezoelectric element 11 which generates a shear deformation (here, in the leftward direction) is also fixed to the upper surface of the wedge-shaped moving element 3, and the piezoelectric element 11 is driven to be synchronized with the piezoelectric element 4 which generates the shearing deformation (the leftward direction). Thus, the wedge-shaped moving element 3 is struck to or extracted from the moving body 5 to perform a very fine movement positioning of the moving body 5 in the perpendicular direction.

Moreover, in FIG. 7, the piezoelectric element 11 can be a piezoelectric element which generates a shear deformation in a depth direction of the page surface. In this case, by rapidly deforming and driving the piezoelectric element 4, the wedge-shaped moving element is moved on the base. And by striking or extracting the wedge-shaped moving element to/from a moving body which is movable in the vertical direction against the base and in the depth direction against the page surface, a fine movement positioning of the moving body in the vertical direction is performed, and by rapidly deforming and driving the piezoelectric element 11, it is possible to perform a fine movement positioning of the moving body, which is movable in the vertical direction and in the depth direction of the page surface, in the depth direction of the page surface.

Further, in FIG. 7, the piezoelectric element 11 can be a layered piezoelectric element in which a piezoelectric element which generates a shear deformation in an inclined surface direction and a piezoelectric element which generates a shear deformation in the depth direction of the page surface are bonded. By rapidly deforming and driving the piezoelectric element 4 on the bottom surface of the wedge-shaped moving element and the element which generates the shear deformation in the inclined surface direction out of the layered piezoelectric element 11, the wedge-shaped moving element is moved on the base. And by striking or extracting the wedge-shaped moving element to/from the moving body, which is movable in the vertical direction against the base and in the depth direction against the page surface, a fine movement positioning of the moving body in the vertical direction is performed. And by rapidly deforming and driving the element which shear-deforms in the depth direction of the page surface out of the layered piezoelectric element 11 arranged on the upper inclined surface, it is also possible to perform a very fine movement positioning of the moving body in the depth direction of the page surface.

Figure 8:
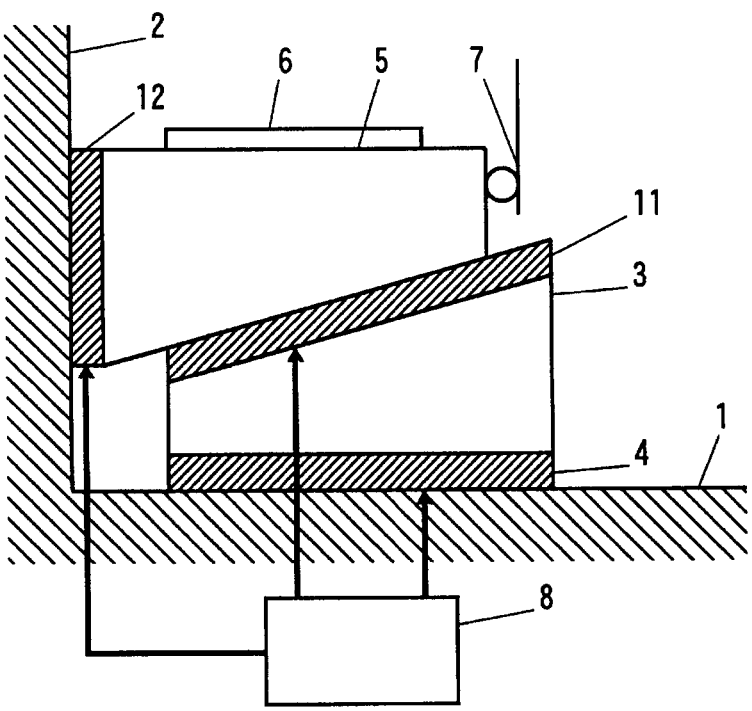
FIG. 8 is a schematic view of a precise and high load resistance moving device illustrating a third embodiment of the present invention.

FIG. 8 is a schematic view of a precise and high load resistance moving device illustrating a third embodiment of the present invention.

In this embodiment, in addition to the second embodiment, a piezoelectric element 12 which generates a shear deformation (here, in a vertical direction) is fixed to a part where the moving body 5 and the wall surface 2 of the fixed part contact, and the piezoelectric element 12 is driven to be synchronized with the piezoelectric elements 4 and 11 which generate the shear deformations. Thus, with a friction coefficient of the surfaces in which the moving body 5 and the wall surface 2 of the fixed part contact being reduced, the wedge-shaped moving element 3 is struck to or extracted from the moving body 5 to perform a fine movement positioning of the moving body 5 in the vertical direction.

Figure 9:
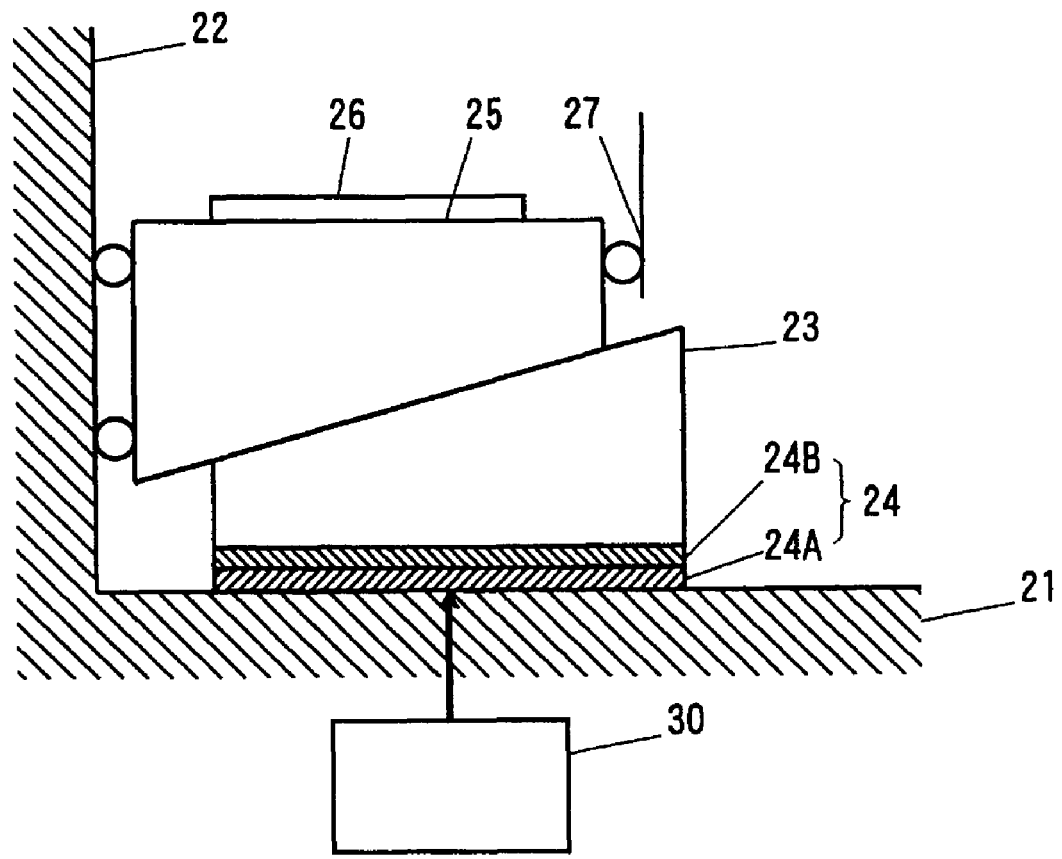
FIG. 9 is a schematic view of a precise and high load resistance moving device illustrating a fourth embodiment of the present invention.

FIG. 9 is a schematic view of a precise and high load resistance moving device illustrating a fourth embodiment of the present invention.

In the drawing, reference numeral 21 denotes a floor surface of a fixed part, reference numeral 22 denotes a wall surface of the fixed part, reference numeral 23 denotes a wedge-shaped moving element, reference numeral 24 denotes a layered piezoelectric element which is fixed to a bottom surface of the wedge-shaped moving element 23 and in which a piezoelectric element 24A which generates a shear deformation (here, in a leftward direction) and a piezoelectric element 24B which generates a vertical deformation (extension) are bonded, and reference numeral 25 denotes a moving body which is driven by the wedge-shaped moving element 23 and moves in a vertical direction, and a sample 26, for example, is placed on an upper surface of the moving body 25. Reference numeral 27 denotes a guide (bearing) which holds the moving body 25 by a spring against the wall surface 22 of the fixed part, and reference numeral 30 denotes a drive pulse source for driving the layered piezoelectric element 24.

When the layered piezoelectric element 24 in which the piezoelectric element 24A which generates the shear deformation and the piezoelectric element 24B which generates the vertical deformation are bonded is rapidly deformed by a pulse from the drive pulse source 30, the wedge-shaped moving element 23 finely moves in a horizontal direction and a perpendicular direction. Then, the wedge-shaped moving element 23 is struck to or extracted from the moving body 25 to perform a very fine movement positioning of the moving body 25 in the perpendicular direction.

Figure 10:
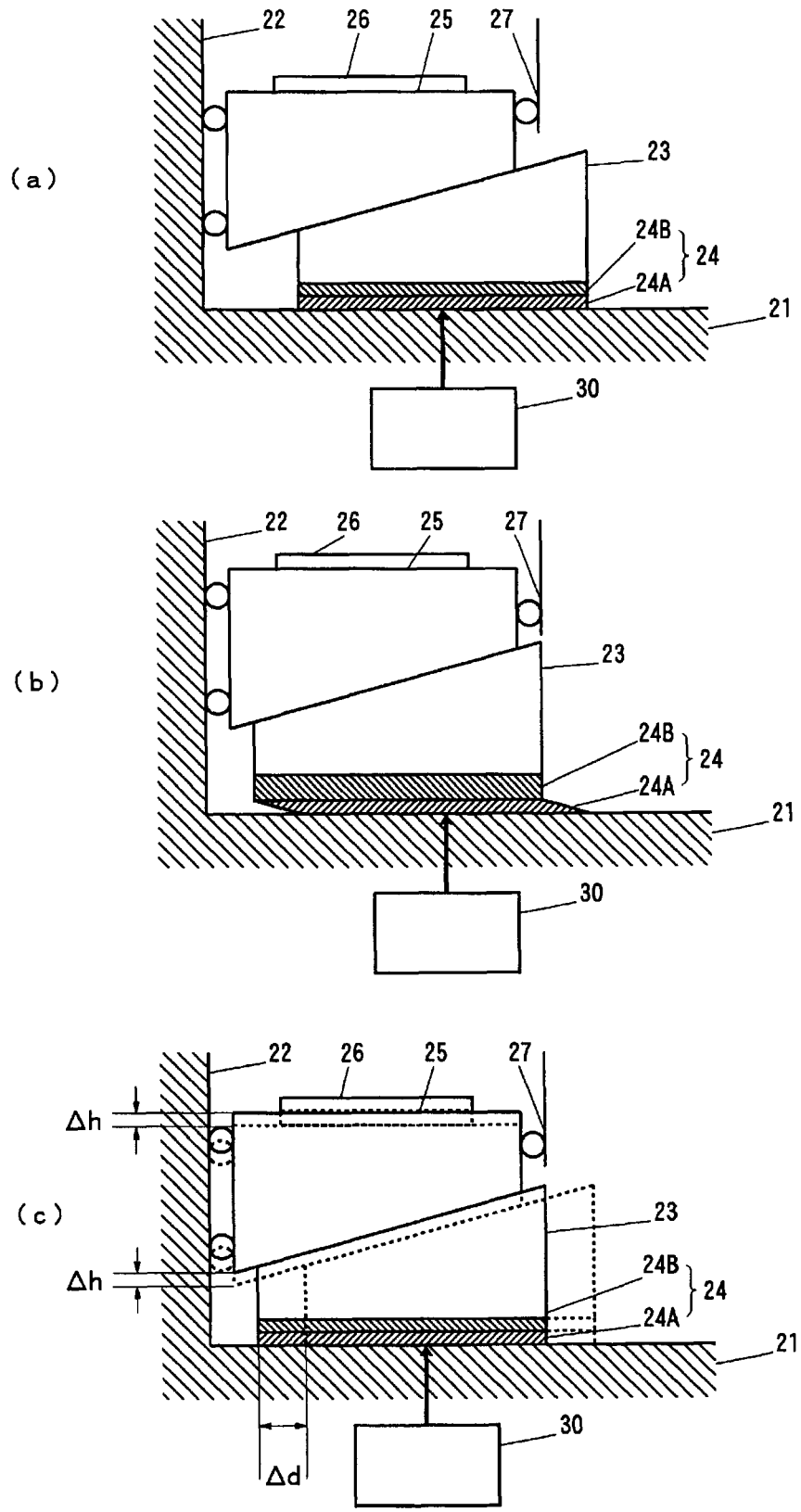
FIG. 10 is a schematic view illustrating operation of the precise and high load resistance moving device illustrating the fourth embodiment of the present invention.
Figure 11:
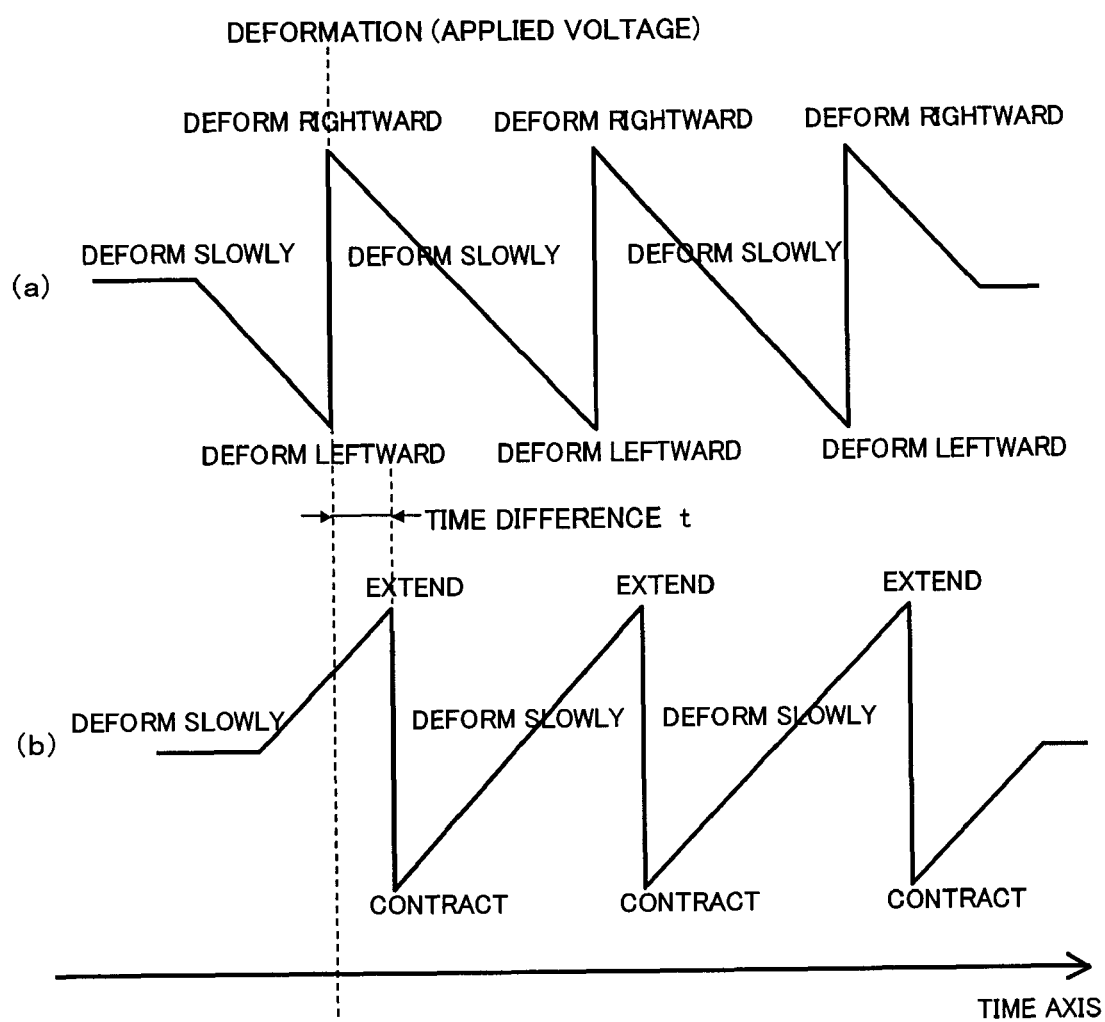
FIG. 11 is a schematic view illustrating an example of drive pulses of the precise and high load resistance moving device illustrating the fourth embodiment of the present invention.

FIG. 10 is a schematic view illustrating operation of the precise and high load resistance moving device illustrating the fourth embodiment of the present invention, and FIG. 11 is a schematic view illustrating an example of drive pulses of the precise and high load resistance moving device.

First, the wedge-shaped moving element 23 is located at a position illustrated in FIG. 10(*a*). To the bottom surface of the wedge-shaped moving element 23, the layered piezoelectric element 24 in which the piezoelectric element 24A which generates the shear deformation (here, in the leftward direction) and the piezoelectric element 24B which generates the vertical deformation (extension) are bonded is fixed.

Then, when a drive pulse illustrated in FIG. 11(*a*) is applied to piezoelectric element 24A which generates the shear deformation and a drive pulse illustrated in FIG. 11(*b*) is applied to the piezoelectric element 24B which generates the vertical deformation, as illustrated in FIG. 10(*b*), first, the piezoelectric element 24A which generates the shear deformation deforms in the leftward direction, and the wedge-shaped moving element 23 moves to the left in response to the deformation. Then, the piezoelectric element 24B which generates the vertical deformation extends to lift up the moving body 25.

That is, as illustrated in FIG. 10(*c*), the piezoelectric element 24A which generates the shear deformation moves in the leftward by $\Delta d$, while the wedge-shaped moving element 23 is struck from the right side of the moving body 25, and then the piezoelectric element 24B which generates the vertical deformation extends to lift up the moving body 25. Thus, the moving body 25 is lifted up vertically upward by $\Delta h$ and positioned.

With respect to the drive pulse, the drive pulse of the mountain shape illustrated in FIG. 6 can be used.

As described above, by performing the shear deformation and vertical deformation rapidly and with an appropriate time difference, a rapid resistant force is generated in the diagonal and downward direction like hops of a rabbit, for instance. Thus, even if a high surface pressure acts on the sliding surface, a displacement in a desired direction can be achieved. In this embodiment, higher load resistance is achieved. Further, with the introduction of the element which generates the vertical deformation, it is possible to increase the limit where movement does not occur anymore.

Further, in FIG. 9, to the part where the moving body 25 and the wall surface 22 of the fixed part contact, in place of the bearing, a layered piezoelectric element (not shown) in which a piezoelectric element which generates a shear deformation and a piezoelectric element which generates a vertical deformation are bonded is fixed, and driven to be synchronized with the piezoelectric element 24. Thus, with a friction coefficient of the surfaces in which the moving body 25 and the wall surface 22 of the fixed part contact being reduced, the wedge-shaped moving element 23 is struck to or extracted from the moving body 25 to perform a fine movement positioning of the moving body 25 in the perpendicular direction.

Figure 12:
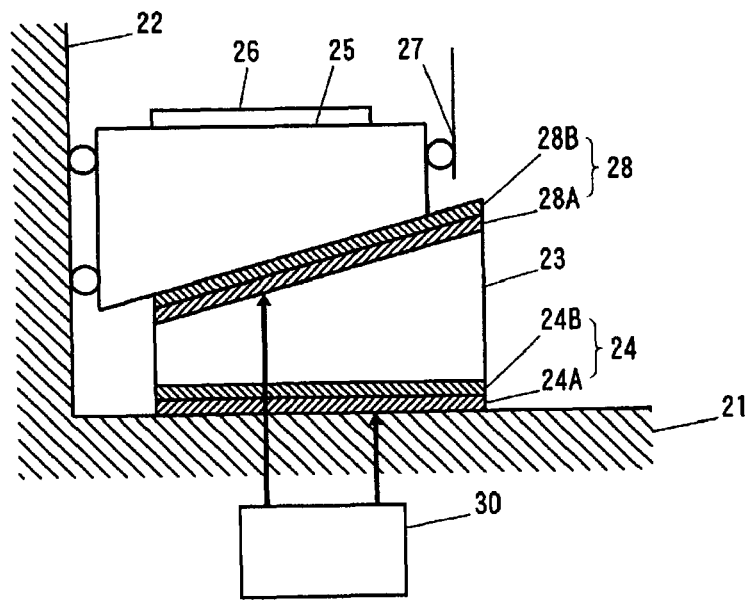
FIG. 12 is a schematic view of a precise and high load resistance moving device illustrating a fifth embodiment of the present invention.

FIG. 12 is a schematic view of a precise and high load resistance moving device illustrating a fifth embodiment of the present invention.

In this embodiment, in addition to the fourth embodiment, to an upper surface of the wedge-shaped moving element 23, a layered piezoelectric element 28 in which a piezoelectric element 28A which generates a shear deformation (here, in the leftward direction) and a piezoelectric element 28B which generates a vertical deformation (extension) are bonded is fixed, and driven to be synchronized with the layered piezoelectric element 24. Thus, the wedge-shaped moving element 23 is struck to or extracted from the moving body 25 to perform a very fine movement positioning of the moving body 25 in the perpendicular direction.

Figure 13:
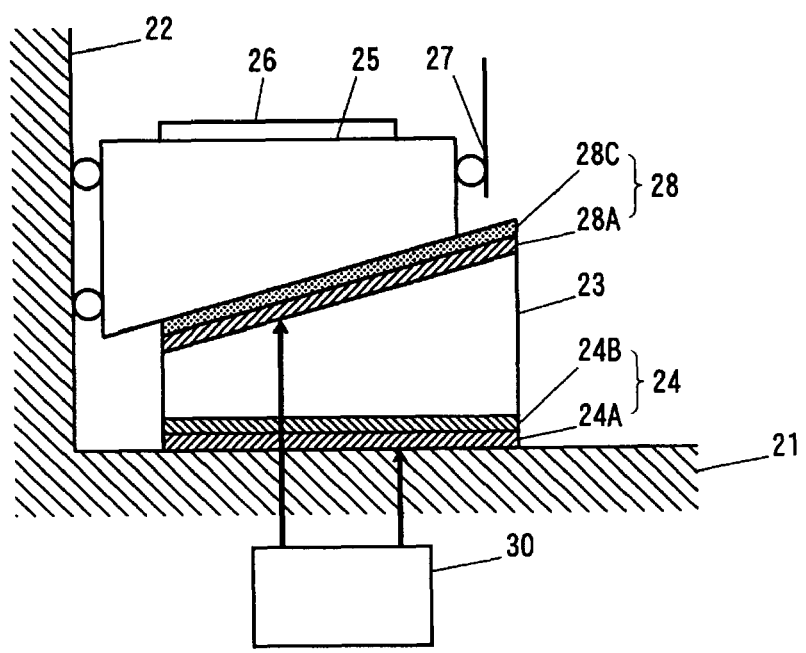
FIG. 13 is a schematic view of the precise and high load resistance moving device illustrating a modification of the fifth embodiment of the present invention.

FIG. 13 is a schematic view of the precise and high load resistance moving device illustrating a modification of the fifth embodiment of the present invention.

In this embodiment, in addition to the fourth embodiment, to the upper surface of the wedge-shaped moving element 23, the layered piezoelectric element 28 in which the piezoelectric element 28A which generates the shear deformation (here, in the leftward direction) and a piezoelectric element 28C which generates a shear deformation in a depth direction of the page surface are bonded is fixed, and driven to be synchronized with the layered piezoelectric element 24. Thus, the wedge-shaped moving element 23 is struck to or extracted from the moving body 25 to perform a fine movement positioning of the moving body 25 in the perpendicular direction. Further, by performing a rapid deformation drive of the piezoelectric element 28C, with the vertical surface (the floor surface 21 of the fixed part) and the lower side of the moving body 25 as guiding surfaces, it is possible to perform a fine movement positioning in the page surface direction.

Figure 14:
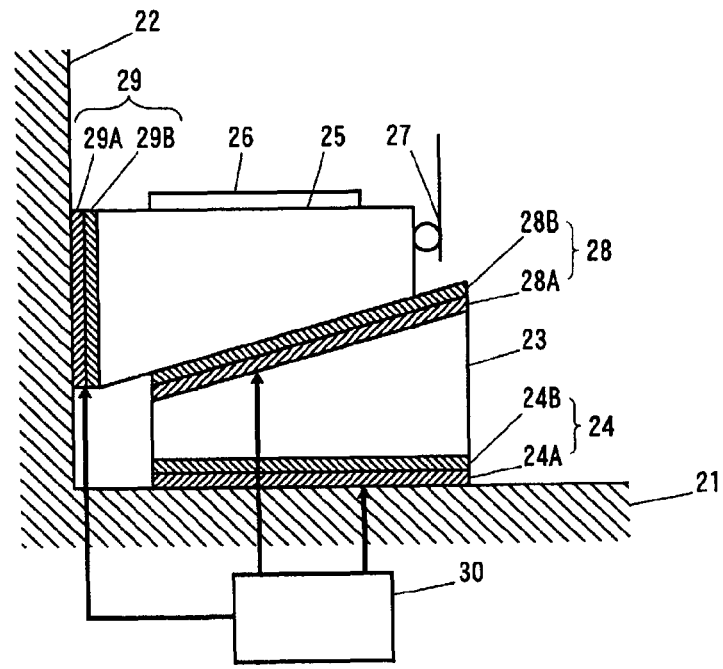
FIG. 14 is a schematic view of a precise and high load resistance moving device illustrating a sixth embodiment of the present invention.

FIG. 14 is a schematic view of a precise and high load resistance moving device illustrating a sixth embodiment of the present invention.

In this embodiment, in addition to the fifth embodiment, to a part where the moving body 25 and the wall surface 22 of the fixed part contact, a layered piezoelectric element 29 in which a piezoelectric element 29A which generates a shear deformation (here, in an upward direction) and a piezoelectric element 29B which generates a vertical deformation are bonded is fixed, and driven to be synchronized with the layered piezoelectric elements 24 and 28. Thus, the wedge-shaped moving element 23 is struck to or extracted from the moving body 25 to perform a fine movement positioning of the moving body 25 in the perpendicular direction.

Figure 15:
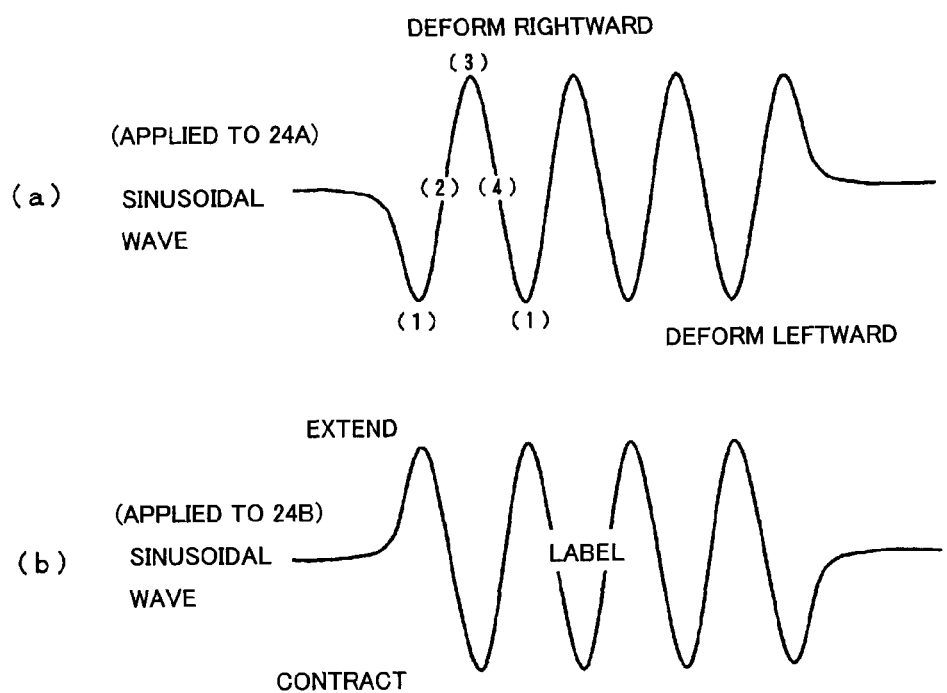
FIG. 15 is a view illustrating waveforms applied to a layered piezoelectric element (see FIG. 9) in an ultrasonic motor mode of a precise and high load resistance moving device of the present invention.
Figure 16:
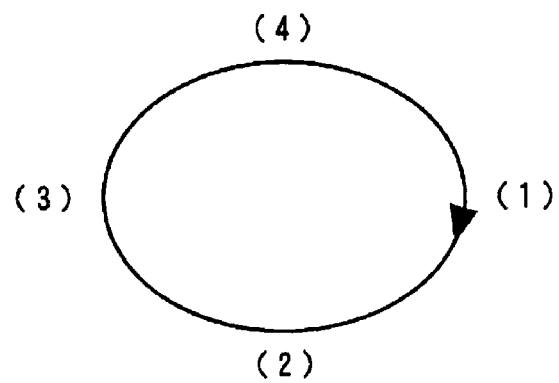
FIG. 16 is a view illustrating behavior of a moving element by the precise and high load resistance moving device illustrated in FIG. 14.

FIG. 15 is a view illustrating waveforms applied to the layered piezoelectric element (see FIG. 9) in an ultrasonic motor mode of a precise and high load resistance moving device of the present invention, and FIG. 16 is a view illustrating micro displacement of a sliding surface of the piezoelectric element side by the precise and high load resistance moving device viewed from a side of a horizontal surface. In this case, macroscopically, the moving element provided with the piezoelectric element moves rightward.

On the floor surface 21 of the fixed part, the piezoelectric element 24A which generates the shear deformation (here, in the leftward direction) and the piezoelectric element 24B which generates the vertical deformation (extension) are bonded, and a sinusoidal wave such as a wave illustrated in FIG. 15($a$) is applied to the piezoelectric element 24A which generates the shear deformation and a sinusoidal wave such as a wave illustrated in FIG. 15($b$) is applied to the piezoelectric element 24B which generates the vertical deformation. Thus, as illustrated in FIG. 16, the sliding surface circulates or elliptically circulates clockwise viewed from a direction the drawing is viewed, and drives the wedge-shaped moving element 23. In place of the above-described sinusoidal waves, a cosine wave can be applied.

As described above, by using a periodic waveform generated from a signal generator, in view of the sinusoidal waves, a rectangular wave, and the pulse property of the moving mechanism, and applying the waveform to a piezoelectric element which generates a vertical deformation or a shear deformation simultaneously or with a phase difference, a high-speed displacement in the ultrasonic motor mode is enabled. By finding a phase difference which is good in movement efficiency and performing a change of a polarity of a lateral deformation to the vertical deformation or a 180° shift of the phase, it is possible to perform an efficient displacement in another direction.

Moreover, to the above-described embodiments, modifications can be applied as follows:

(1) In place of the guides 7 and 27 which hold the above-described precise and high load resistance moving device by springs, a magnetic body can be used as the wall surface of the fixed part, and by arranging a magnet to the wall surface side of the fixed part of the moving body, the moving body can be attached to the fixed part. The attachment means of the magnet to the fixed part of the moving body can be applied to all the other embodiments (see FIGS. 3, 4, 7, 8, 9, 10, 12, 13, 14, 18).

Figure 17:
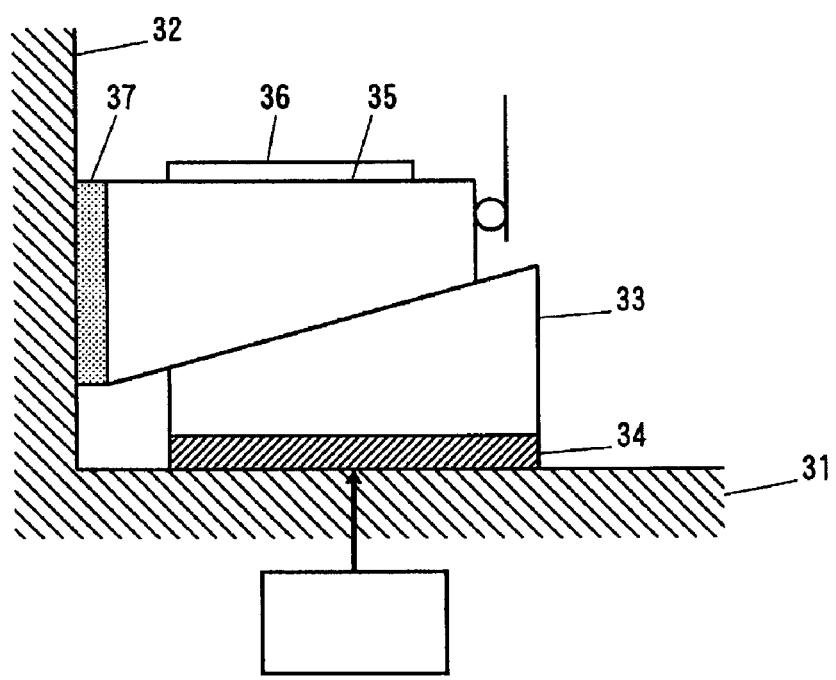
FIG. 17 is a view illustrating a modification of a guide of the precise and high load resistance moving device according to the present invention.

FIG. 17 is a view illustrating a modification of the guide of the precise and high load resistance moving device.

In the drawing, reference numeral 31 denotes a floor surface of a fixed part, reference numeral 32 denotes a wall surface of the fixed part formed of a magnetic body, reference numeral 33 denotes wedge-shaped moving element, reference numeral 34 denotes a piezoelectric element which generates a shear deformation (here, in a leftward direction) and fixed to a bottom surface of the wedge-shaped moving element 33, reference numeral 35 denotes a moving body which is driven by the wedge-shaped moving element 33 and moves in a perpendicular direction, and a sample 36, for example, is placed on an upper surface of the moving body 35. Reference numeral 37 denotes a magnet which is fixed to the moving body 35 so as to come in contact with the wall surface 32 of the fixed part formed of the magnetic body.

(2) In place of the above-described guide of the magnet, although it is not shown, a guide mechanism by a ball bearing can be used.

(3) Not by the above-described layered piezoelectric element which is directly in contact with the floor surface of the fixed part, but by providing another sliding surface to the layered piezoelectric element, the layered piezoelectric element can contact the floor surface.

Figure 18:
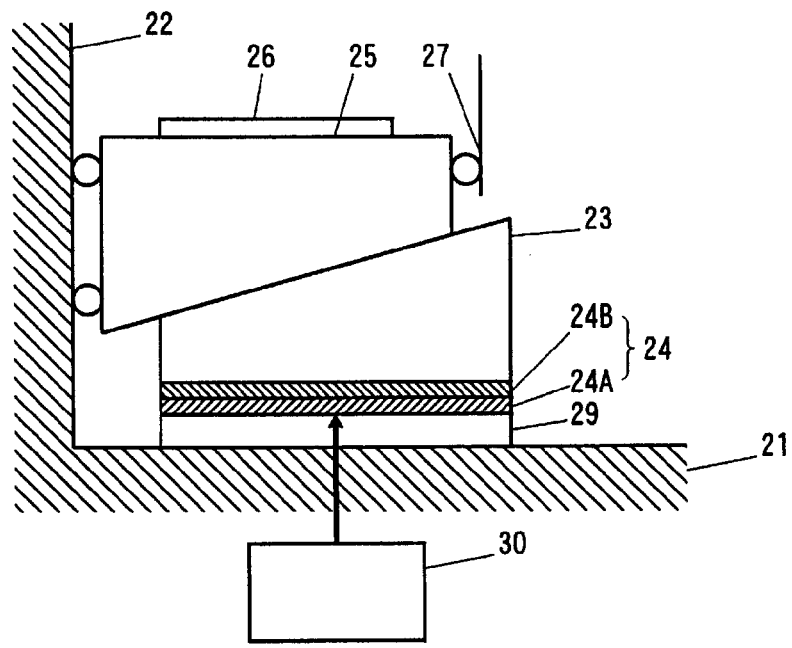
FIG. 18 is a schematic view of a precise and high load resistance moving device provided with a sliding surface of the present invention.

FIG. 18 is a schematic view of a precise and high load resistance moving device provided with the sliding surface.

Here, it is structured that the sliding surface 29 fixed to the bottom surface of the layered piezoelectric element 24 contacts the floor surface 21 of the fixed part.

With such a structure, a stable contact state can be maintained.

Figure 19:
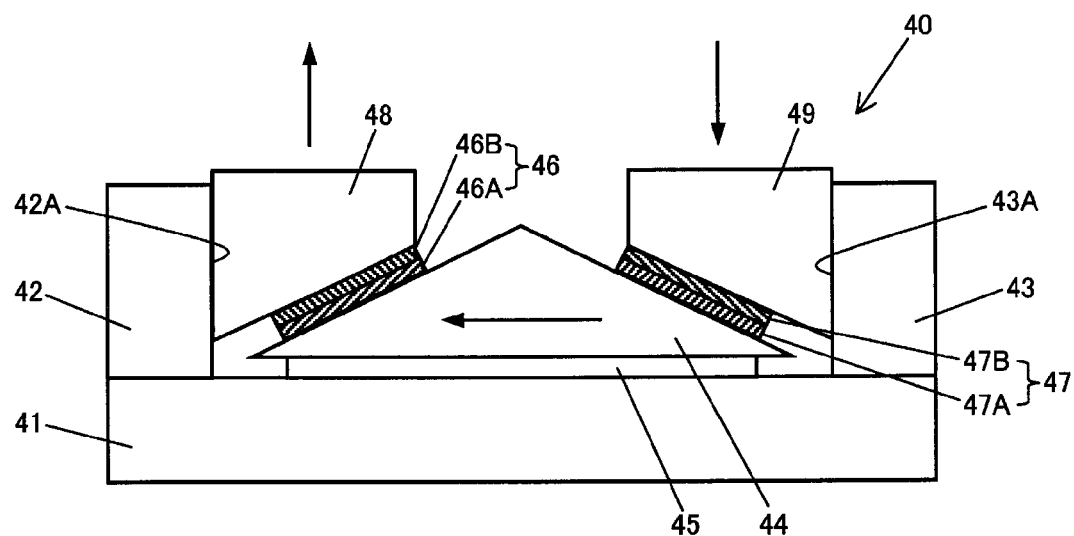
FIG. 19 is a schematic view of a precise and high load resistance moving device (1) of the present invention which has a vertical positioning mechanism in which a positional potential is not changed as a whole.

Next, FIG. 19 is a schematic view of a precise and high load resistance moving device (1) of the present invention which has a vertical positioning mechanism in which a positional potential is not changed as a whole.

In the drawing, reference numeral 40 denotes a precise high load resistance moving device having a vertical positioning mechanism, reference numeral 41 denotes a base, reference numeral 42 denotes a first fixed part (base), reference numeral 42A denotes a side wall of the first fixed part (base), reference numeral 43 denotes a second fixed part (base), reference numeral 43A denotes a side wall of the second fixed part (base), reference numeral 44 denotes a wedge which has a triangular shape in a cross section, reference numeral 45 denotes a first piezoelectric element formed of a piezoelectric element which generates a shear deformation and which is fixed to a bottom surface of the wedge 44 which has the triangular shape in the cross section, reference numeral 46 denotes a second piezoelectric element which is fixed to an inclined surface of a left side of the wedge 44 which has the triangular shape in the cross section and formed of a layered piezoelectric element in which a piezoelectric element 46A which generates a shearing deformation and a piezoelectric element 46B which generates a vertical deformation are bonded, reference numeral 47 denotes a third piezoelectric element which is fixed to the inclined surface of a right side of the wedge 44 which has the triangular shape in the cross section and formed of a layered piezoelectric element in which a piezoelectric element 47A generates a shear deformation and a piezoelectric element 47B which generates a vertical deformation are bonded, reference numeral 48 denotes a first moving body, and reference numeral 49 denotes a second moving body.

With such a structure, in a vertical positioning mechanism including the first moving body 48 and the second moving body 49, by simultaneously driving the first moving body 48 and the second moving body 49, a wedge-shaped moving mechanism in which positional potential is not changed as a whole can be provided. The mechanism has an advantage that no difference in an upward and downward moving property arise, and possess high reliability. A spring for pressing the sliding surface and a magnet for obtaining pressing force are not necessary and it is possible to resist a heavy load with the wedge. Further, displacement to a vertical load is hardly generated. With the drive of the second piezoelectric element 46 and the third piezoelectric element 47, the first moving body 48 and the second moving body 49 can be displaced in the vertical direction.

Figure 20:
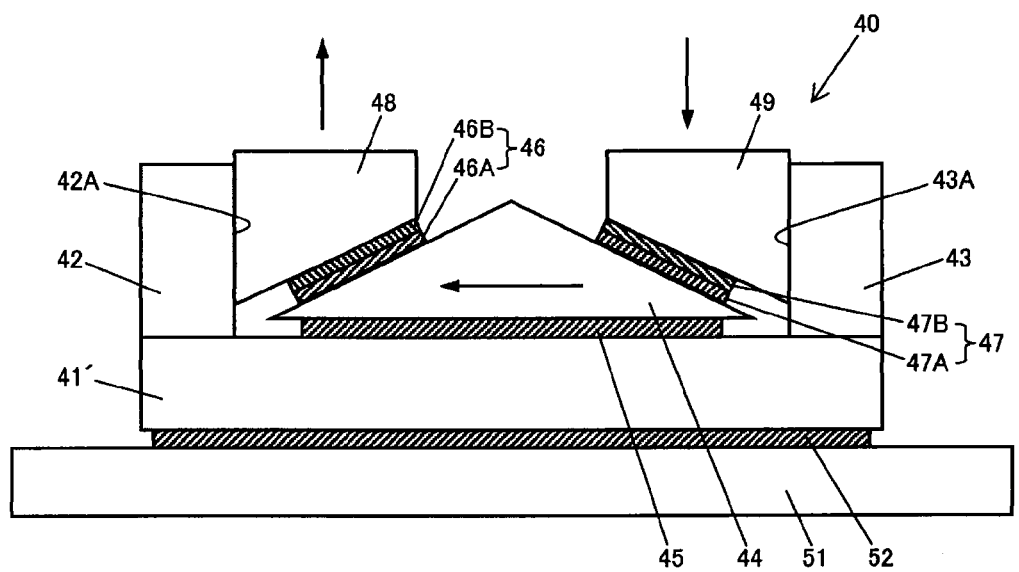
FIG. 20 is a schematic view of a precise and high load resistance moving device (2) of the present invention which has a vertical positioning mechanism in which a positional potential is not changed as a whole.

FIG. 20 is a schematic view of a precise and high load resistance moving device (2) of the present invention which has a vertical positioning mechanism in which a positional potential is not changed as a whole.

Here, the precise and high load resistance moving device 40 which has the vertical positioning mechanism illustrated in the above-described FIG. 19 is placed on a first base 51 through a fourth piezoelectric element 52 which is fixed to a bottom surface of a second base 41' and formed of a piezoelectric element which generates a shear deformation.

Also in this embodiment, in the vertical positioning mechanism including the first moving body 48 and the second moving body 49, the wedge-shaped moving mechanism in which positional potential is not changed as a whole can be provided. The mechanism has the advantage that no difference in the upward and downward property arise, and possess high reliability. The spring for pressing the sliding surface and the magnet for obtaining pressing force are not necessary and it is possible to resist the heavy load with the wedge. Further, displacement to the vertical load is hardly generated. The first moving body 48 and the second moving body 49 can be displaced not only in the vertical direction, but, with a drive of the fourth piezoelectric element 52 formed of the piezoelectric element which generates the shear deformation, can be displaced in the lateral direction.

Moreover, as a modification of the positioning mechanism described in FIGS. 19 and 20, in a case in which the shear deformation piezoelectric elements 46A and 47A, or the vertical deformation piezoelectric elements 46B and 47B are excluded, a similar displacement can be obtained.

Figure 21:
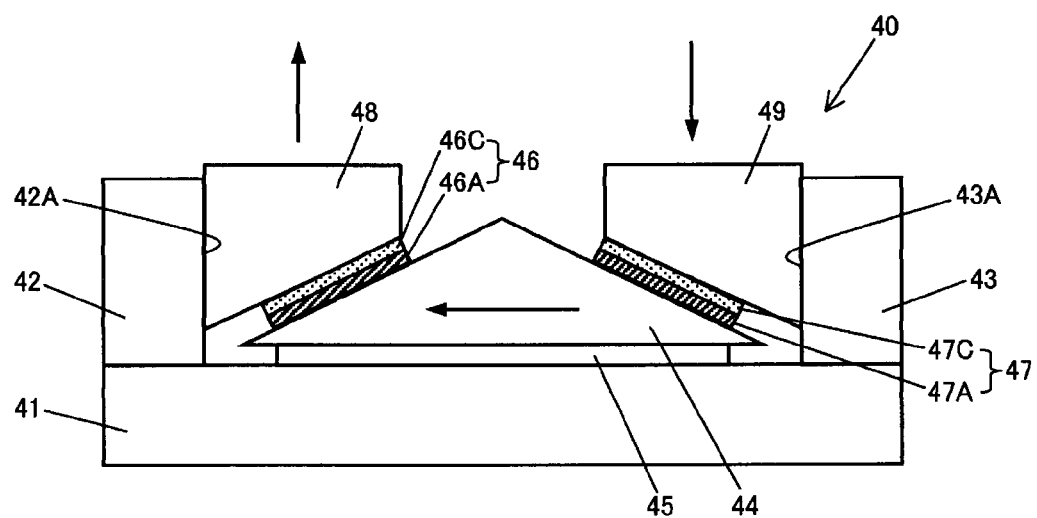
FIG. 21 is a schematic view of a precise and high load resistance moving device (3) of the present invention which has a vertical positioning mechanism and a positional potential is not changed as a whole in which a moving element has a movement positioning function in xyz three axes.
Figure 22:
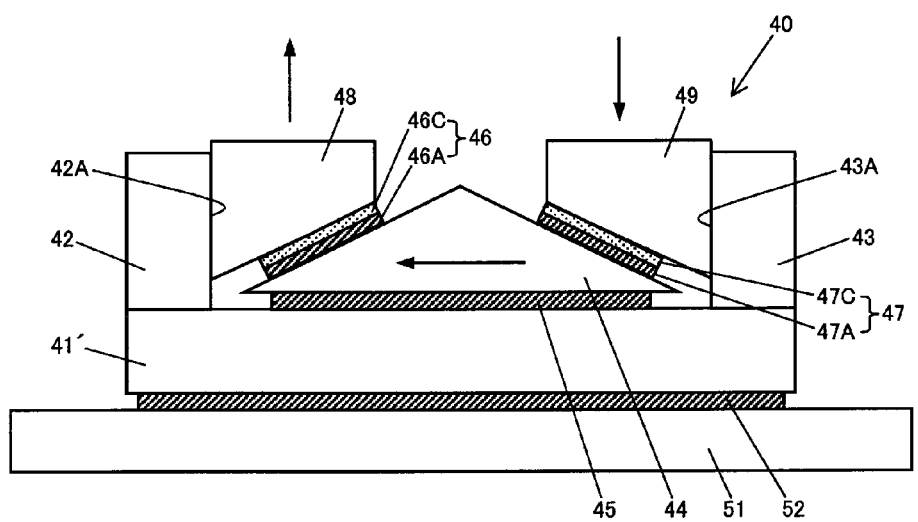
FIG. 22 is a schematic view of a precise and high load resistance moving device (4) of the present invention which has a vertical positioning mechanism in which a positional potential is not changed as a whole and a moving element has a movement positioning function in xyz three axes.

FIG. 21 is a schematic view of a precise and high load resistance moving device (3) of the present invention which has a vertical positioning mechanism in which a positional potential is not changed as a whole in which a moving element has a movement positioning function in xyz three axes, and FIG. 22 is a schematic view of a precise and high load resistance moving device (4) of the present invention which has a vertical positioning mechanism in which a positional potential is not changed as a whole in which a moving element has a movement positioning function in xyz three axes.

Here, in the precise and high load resistance moving device 40 which has the vertical positioning mechanism illustrated in FIG. 19 or 20, of piezoelectric elements 46C and 47C which generate shear deformations in a depth direction of the page surface are arranged, and displacement positioning of the moving bodies 48 and 49 in the depth direction of the page surface can be performed.

In FIG. 21, the reference numeral 40 denotes the precise and high load resistance moving device which has the vertical positioning mechanism, the reference numeral 41 denotes the base, the reference numeral 42 denotes the first fixed part (base), the reference numeral 42A denotes the side wall of the first fixed part (base), the reference numeral 43 denotes the second fixed part (base), the reference numeral 43A denotes the side wall of the second fixed part (base), the reference numeral 44 denotes the wedge which has the triangular shape in the cross section, the reference numeral 45 denotes the first piezoelectric element formed of the piezoelectric element which generates the shearing deformation and which is fixed to the bottom surface of the wedge 44 which has the triangular shape in the cross section, the reference numeral 46 denotes the second piezoelectric element which is fixed to the inclined surface of the left side of the wedge 44 which has the triangular shape in the cross section and formed of the layered piezoelectric element in which the piezoelectric element 46A which generates the shear deformation and a piezoelectric element 46C which generates a shear deformation in the depth direction of the page surface are bonded, the reference numeral 47 denotes the third piezoelectric element which is fixed to the inclined surface of the right side of the wedge 44 which has the triangular shape in the cross section and formed of the layered piezoelectric element in which the piezoelectric element 47A which generates the shear deformation and a piezoelectric element 47C which generates a shear deformation in the depth direction of the page surface are bonded, the reference numeral 48 denotes the first moving body, and the reference numeral 49 denotes the second moving body.

With such a structure, in the vertical positioning mechanism including the first moving body 48 and the second moving body 49, simultaneously driving the first moving body 48 and the second moving body 49, the wedge-shaped moving mechanism in which positional potential is not changed as a whole can be provided. The mechanism has the advantage that no difference in the upward and downward moving property arise, and possess high reliability. The spring for pressing the sliding surface and the magnet for obtaining pressing force are not necessary and it is possible to resist a heavy load with the wedge. Further, displacement to the vertical load is hardly generated. With a drive of the piezoelectric element 46A and the piezoelectric element 47A, the first moving body 48 and the second moving body 49 can be displaced in the vertical direction. Moreover, with a rapid deformation drive of the piezoelectric element 46C, a fine movement positioning of the moving body 48 in the page surface direction can be performed, and with a rapid deformation drive of the piezoelectric element 47C, a fine movement positioning of the moving body 49 in the depth direction of the page surface direction can be performed. That is, with the vertical positioning mechanism in which the positional potential is not changed as a whole, the movement positioning in the xyz three axes directions can be performed.

Further, in FIG. 22, the precise and high load resistance moving device 40 which has the vertical positioning mechanism illustrated in the above-described FIG. 21 is placed on the first base 51 through the fourth piezoelectric element 52 which is fixed to the bottom surface of the second base 41' and formed of the piezoelectric element which generates the shear deformation.

Also in this embodiment, in the vertical positioning mechanism including the first moving body 48 and the second moving body 49, the wedge-shaped moving mechanism in which positional potential is not changed as a whole can be provided. The mechanism has the advantage that no difference in the upward and downward moving property arise, and possess high reliability. The spring for pressing the sliding surface and the magnet for obtaining pressing force are not necessary and it is possible to resist the heavy load with the wedge. Further, displacement to the vertical load is hardly generated. The first moving body 48 and the second moving body 49 can be displaced not only in the vertical direction and in the normal line of the page surface, but in the lateral direction, with the drive of the fourth piezoelectric element 52 formed of the piezoelectric element which generates the shear deformation.

Moreover, as a modification of the positioning mechanism described in FIGS. 21 and 22, in a case in which the shear deformation piezoelectric elements 46A and 47A are excluded, a similar displacement in xyz three axes can be obtained.

Figure 23:
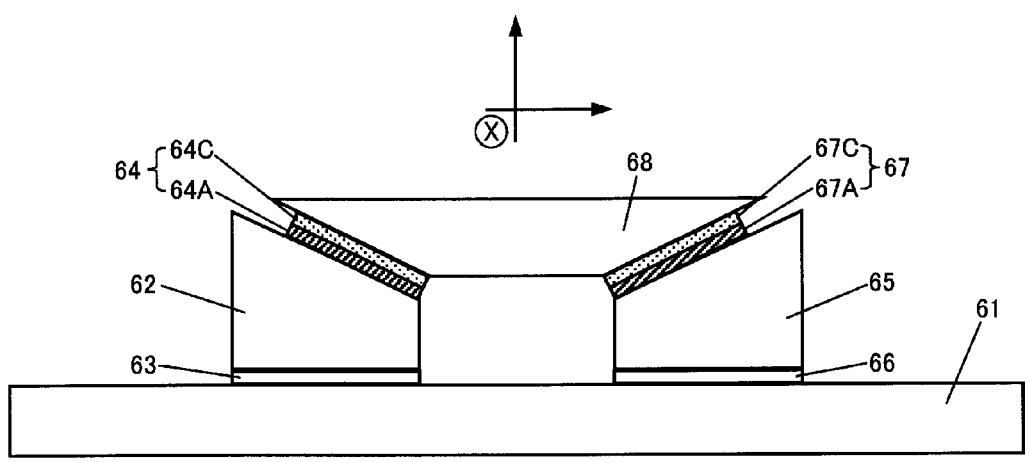
FIG. 23 is a schematic view of a precise and high load resistance moving device of the present invention which positions a moving element in xyz directions using a base, two wedges, and four piezoelectric elements.

FIG. 23 is a schematic view of a precise and high load resistance moving device of the present invention which positions a moving body in xyz directions using a base, two wedges, and four piezoelectric elements.

In the drawing, reference numeral 61 denotes a base, reference numeral 62 denotes a first wedge which is arranged at a left side on the base 61 and has a horizontal bottom surface and an inclined surface of which the inside is lower. To the bottom surface of the first wedge 62, a first piezoelectric element 63 formed of a piezoelectric element which generates a shear deformation is fixed, and on the inclined upper surface, a second piezoelectric element 64 formed of a layered piezoelectric element in which a piezoelectric element 64A which generates a shear deformation and a piezoelectric element 64C which generates a shear deformation in a depth direction of the page surface are bonded is fixed. Further, reference numeral 65 denotes a second wedge which is arranged at a right side on the base 61 and has a horizontal bottom surface and an inclined surface of which the inside is lower as an upper surface. To the bottom surface of the second wedge 65, a third piezoelectric element 66 formed of a piezoelectric element which generates a shearing deformation is fixed, and on the inclined upper surface, a fourth piezoelectric element 67 formed of a layered piezoelectric element in which a piezoelectric element 67A which generates a shear deformation and a piezoelectric element 67C which generates a shear deformation in the depth direction of the page surface are bonded is fixed. Reference numeral 68 denotes a moving body which is arranged so as to be bridged by the first wedge 62 and the second wedge 65.

As described above, this embodiment is the precise and high load resistance moving device which has the base 61 and the two wedges 62 and 65, and positions the moving body 68 in the xyz directions. The first wedge 62 and the second wedge 65 can move laterally by the drive of the first piezoelectric element 63 and the third piezoelectric element 66, and moreover, in response to the movement of the first wedge 62 and the second wedge 65, and by the drive of the second piezoelectric element 64 and the fourth piezoelectric element 67, the moving body 68 can move in the vertical direction. Further, by the shear deformation drive of the piezoelectric elements 64C and 67C, the moving body 68 can be moved and positioned in the depth direction of the page surface. That is, it is possible to perform the movement positioning in the xyz three axes as a whole.

As a modification of the positioning mechanism described in FIG. 23, in a case in which the shear deformation piezoelectric elements 64A and 67A are excluded, a deformation of a similar degree of freedom can be obtained.

Further, as another modification of the positioning mechanism described in FIG. 23, in a case in which the piezoelectric elements 63 and 66 are replaced with layered piezoelectric elements in which a shear deformation piezoelectric element and a vertical deformation piezoelectric element are bonded, a deformation of a similar degree of freedom can be obtained.

Figure 24:
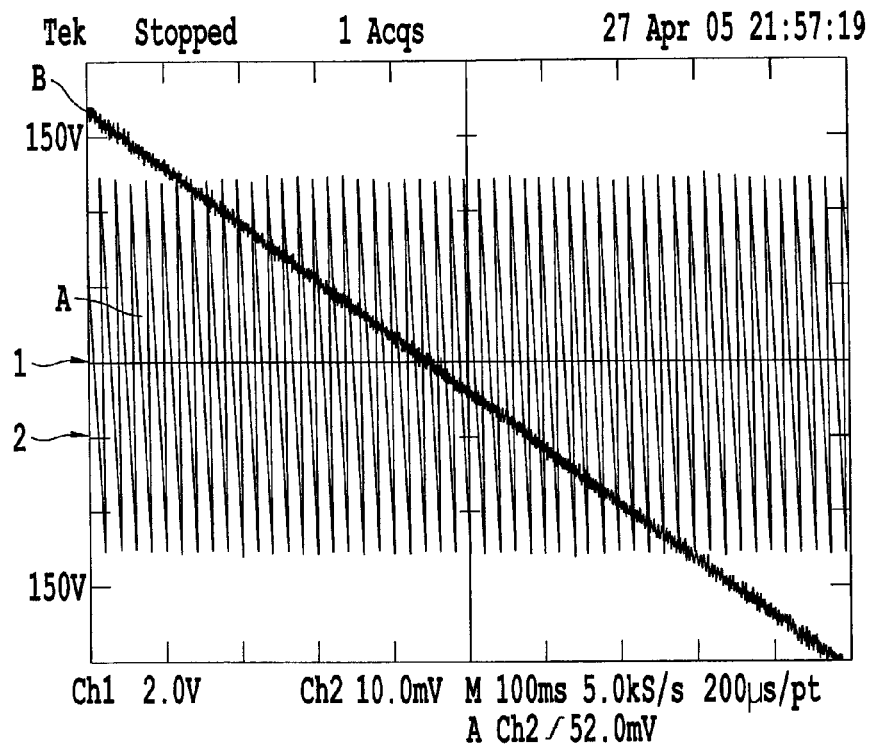
FIG. 24 is a view (1) in which displacements of a moving element of a precise and high load resistance moving device of the present invention in a vertical direction is measured.
Figure 25:
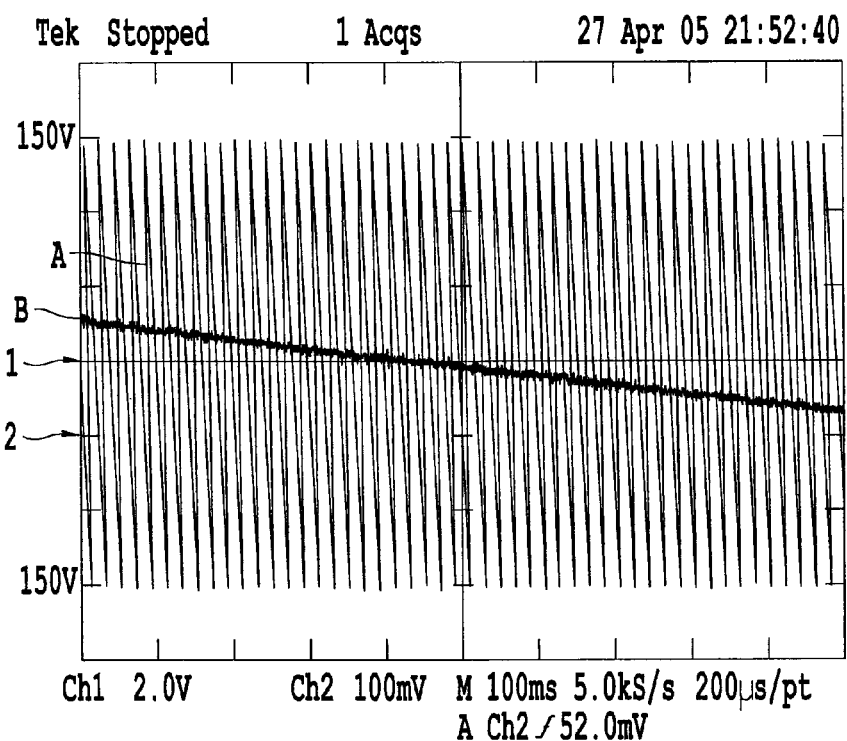
FIG. 25 is a view (2) in which displacements of a moving element of a precise and high load resistance moving device of the present invention in a vertical direction is measured.
Figure 26:
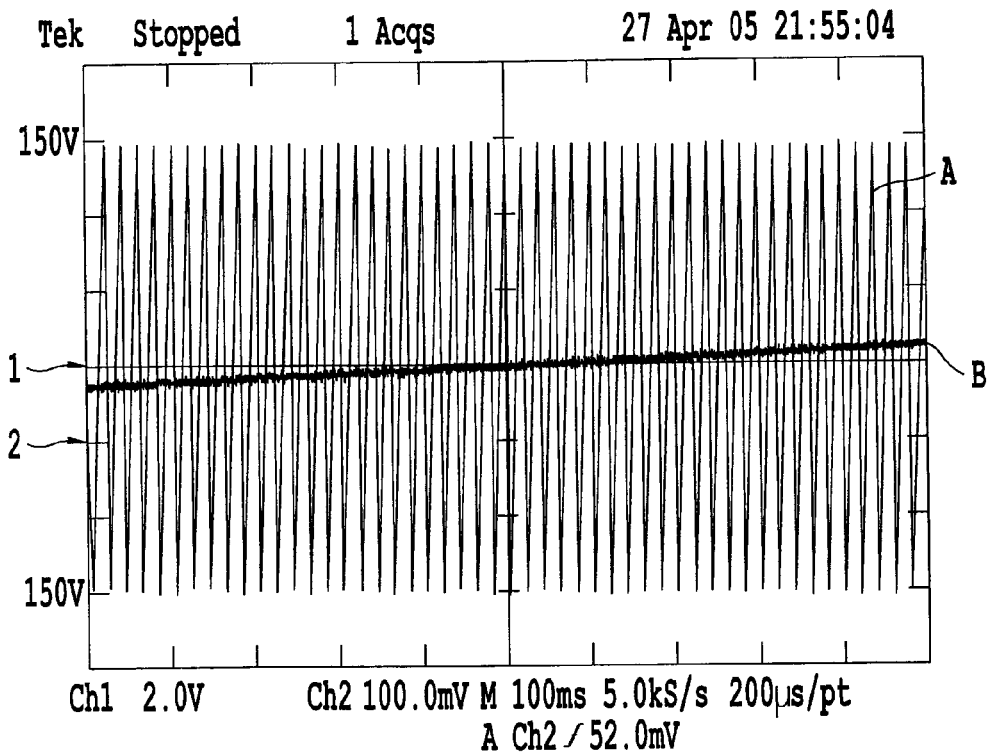
FIG. 26 is a view (3) in which displacements of a moving element of a precise and high load resistance moving device of the present invention in a vertical direction is measured.
Figure 27:
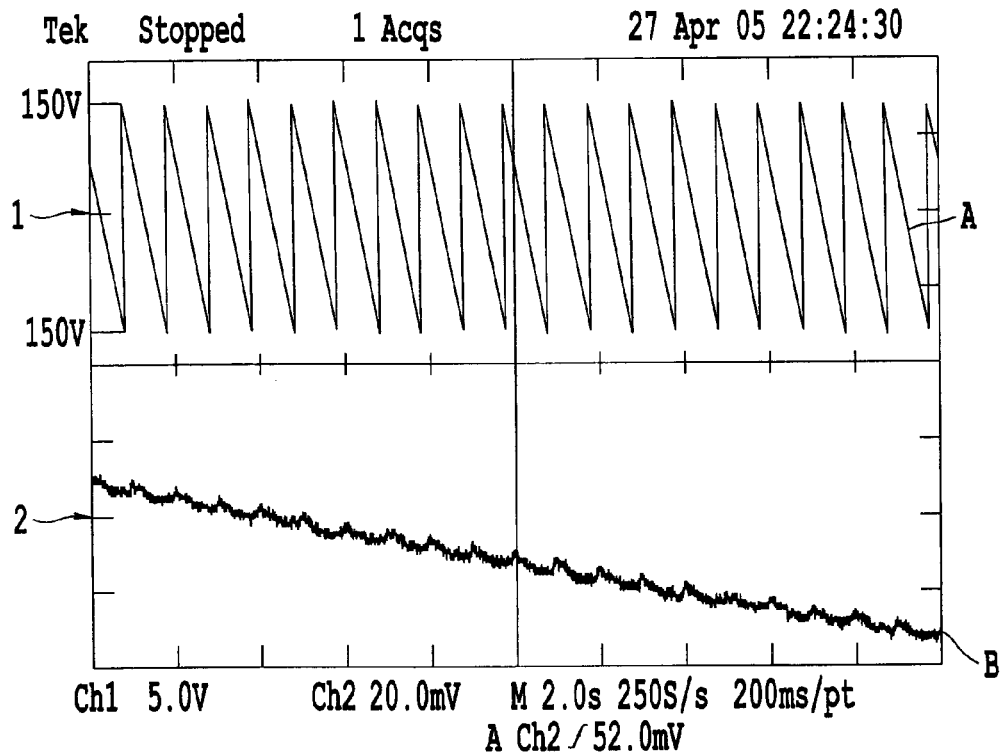
FIG. 27 is a view (4) in which displacements of a moving element of a precise and high load resistance moving device of the present invention in a vertical direction is measured.

FIGS. 24 to 28 are views (1) to (5) in which, using the device described in FIG. 23, displacements of the moving body 68 in the vertical direction which is generated by the displacement of the wedges 62 and 65 in the lateral direction are measured. FIG. 24 illustrates a decreasing tendency. When rapid deformation is driven with a sawtooth voltage (A) of 300 Vpp at 50 steps per second, and vertical displacements are expressed at 100 nm/div (B), a displacement of 20 nm per step was obtained. Accordingly, it is understood that a very high linearity can be obtained. FIG. 25 also illustrates a decreasing tendency. When rapid deformation is driven at 50 steps per second with a sawtooth voltage (A) of 300 Vpp, and vertical displacements are expressed at 1 µm/div (B), a displacement of 20 nm per step was obtained. FIG. 26 illustrates an increasing tendency at the vertical displacement scale of the same drive condition as in FIG. 25, and a displacement of 20 nm per step was obtained. FIGS. 25 and 26, in both directions of vertically upward and downward, illustrates that stable fine movements are possible. FIG. 27 illustrates a decreasing tendency measured by increasing sensitivity of a displacement sensor. When rapid deformation is driven at 1 step per second with the sawtooth voltage (A) of 300 Vpp, and vertical displacements are expressed at 200 nm/div (B), a displacement of 17 nm per step was obtained. FIG. 28 illustrates an increasing tendency at the same drive condition as in FIG. 27. When vertical displacements are expressed at 50 nm/div (B), a displacement of 5 nm per step was obtained. FIGS. 27 and 28 illustrate that a displacement of upward or downward is definitely generated per step.

Figure 30:
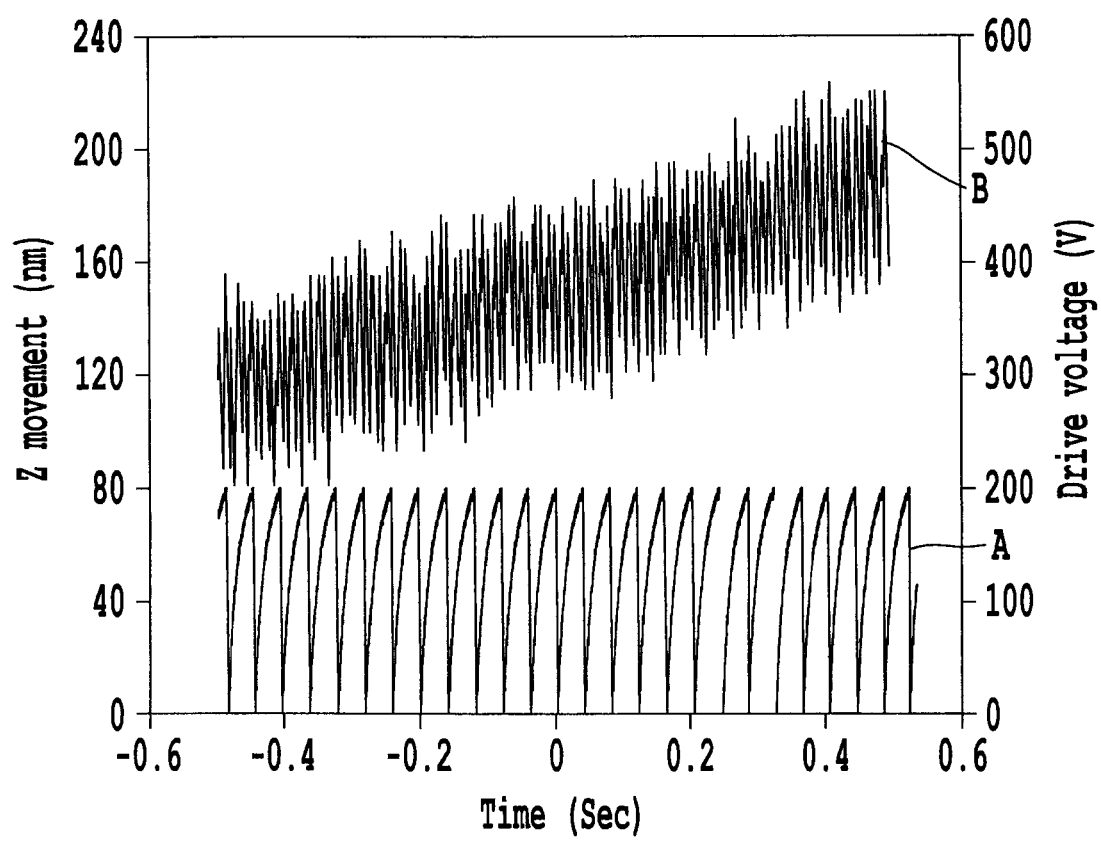
FIG. 30 is a view (7) in which displacements of a moving element of a precise and high load resistance moving device of the present invention in a vertical direction is measured.

FIGS. 29 and 30 are views (6 and 7) in which, using the device described in FIG. 7, displacements of the moving body 5 in a vertical direction which is generated by extracting or striking the wedge-shaped moving element 3 are measured. In a case in which driven at a sawtooth voltage (A) of 200 Vpp, and vertical displacements are expressed at 2.5 nm/div (B), it is illustrated that vertical movement positioning is possible and a fine movement on the order of nanometers is possible. In FIGS. 29 and 30, fine vibration of the vertical displacements of Bs is noise.

As clearly understood from the above drawings, it is confirmed that the upward and downward displacement positioning can be possible, the displacement on the order ranging from 1 nm to 10 nm per step can be realized, the high linear displacement to the rapid deformation signal of a certain frequency can be obtained, and the definite stepping operation in each step can be obtained. Further, as a feature of the wedge, it is confirmed that even if a load on the order of kilograms in vertically downward direction is given, no displacement is generated.

According to the present invention, as compared to known moving mechanisms using a piezoelectric element, a larger surface pressure to a sliding surface can be selected, and a larger load can be moved. Moreover, by generating an elliptical vibration using the piezoelectric element which generates a shear deformation and the piezoelectric element which generates a vertical deformation, that is, by applying a sinusoidal wave or a rectangular wave having different phases to each piezoelectric element, a high-speed displacement as an ultrasonic motor capable of bidirectional high-speed movement is also possible. Further, by using the wedge-shaped moving element, it is possible to realize higher load resistance and finer positioning due to the deceleration effect of movement. Further, with the wedge-shaped moving element, even if a large downward force is given, there are advantages that a displacement is accurately generated and the positioned point can be retained. Further, with the combination of the wedge-shaped moving element and the piezoelectric element, the xyz moving mechanism can be realized.

Further, as well as having the high-rigidity, and the high-character frequency, the compact structure can be realized.

As described above, in the present invention, the device capable of positioning a load on the order of kilograms in the vertical direction using the fine piezoelectric element can be provided and the resolution is on the order of nanometers.

The piezoelectric element can be fixed to either opposite surface. Moreover, in place of the layered piezoelectric element, each layer which composes the layered piezoelectric element can be fixed to each opposite surface.

The present invention is not limited to the embodiments described above, various modifications can be made in light of the spirit of the present invention, and they are not excluded from the scope of the present invention.

INDUSTRIAL APPLICABILITY

The precise and high load resistance moving method and device using the wedge-shaped moving element and the piezoelectric element according to the present invention are applicable for a precise moving mechanism and a moving mechanism of a sample in a microscope.

The invention claimed is:

1. A precise and high load resistance moving method comprising:
   (a) fixing a first piezoelectric element which generates a shear deformation, to a bottom surface of a wedge-shaped moving element which is placed on a base having wall surfaces to both sides and has a triangular shape having two inclined surfaces on the upper side in a cross section, and fixing second and third piezoelectric elements which generate shear deformations in a depth direction of the page surface to each upper inclined surface of both sides of the wedge-shaped moving element, and
   (b) moving the wedge-shaped moving element is laterally moved on the base by rapidly deforming and driving the first piezoelectric element, and striking or extracting the wedge-shaped moving element to/from two moving bodies movable in a vertical direction to the base and in a depth direction to the page surface, whereby a fine movement positioning of the moving bodies in the vertical direction is performed so that a total of potential energy of the two moving bodies in the vertical direction is not changed, and, by rapidly deforming and driving the second and third piezoelectric elements, whereby a fine movement positioning of the moving bodies in the depth direction of the page surface is also performed.

2. A precise and high load resistance moving method comprising:
   (a) fixing a piezoelectric element which generates a shear deformation, to a bottom surface of a wedge-shaped moving element which is placed on a base having wall surfaces to both sides and has a triangular shape having two inclined surfaces on the upper side in a cross section, and fixing a layered piezoelectric element in which a piezoelectric element which generates a shear deformation along an inclined surface and a piezoelectric element which generates a shear deformation in a depth direction of the page surface are bonded, to each upper inclined surface of both sides of the wedge-shaped moving element, and
   (b) moving the wedge-shaped moving element on the base by rapidly deforming and driving the piezoelectric element fixed to the bottom surface of the wedge-shaped moving element which is placed on the base and has the triangular shape having the two inclined surfaces on the upper side in the cross section, and the piezoelectric element which generates the shear deformation along the inclined surface, and striking or extracting the wedge-shaped moving element to/from two moving bodies movable in a vertical direction to the base and in a depth direction of the page surface, whereby a fine movement positioning of the moving bodies is performed so that a total of potential energy of the two moving bodies in the vertical direction is not changed, and, by rapidly deforming and driving the piezoelectric element arranged on the upper inclined surface and generates the shear deformation in the depth direction of the page surface, a fine movement positioning of the moving bodies in the depth direction of the page surface is also performed.

3. A precise and high load resistance moving method wherein a precise and high load resistance moving device in which a first piezoelectric element which generates a shear deformation is fixed to a bottom surface of a wedge-shaped moving element which is placed on a first base having wall surfaces to both sides and has a triangular shape having two inclined surfaces on the upper side in a cross section, second and third piezoelectric elements which generate shear deformations in a depth direction of the page surface is fixed to each upper inclined surface of both sides of the wedge-shaped moving element, the wedge-shaped moving element is laterally moved on the first base by rapidly deforming and driving the first piezoelectric element, and striking or extracting the wedge-shaped moving element to/from two moving bodies movable in a vertical direction to the base and in a depth direction of the page surface, a fine movement positioning of the moving bodies is performed in the vertical direction so that a total of potential energy of the two moving bodies in the vertical direction is not changed, and, by rapidly deforming and driving the second and third piezoelectric elements, a fine movement positioning of the moving bodies in the depth direction of the page surface, comprising placing the device on a second base through a fourth piezoelectric element which generates a shear deformation and which is fixed to a bottom surface of the first base, and moving the precise and high load resistance moving device on the second base in the horizontal direction by rapidly deforming and driving the fourth piezoelectric element, whereby a positioning of the moving bodies in xyz directions is performed.

4. The precise and high load resistance moving method according to claim 3, wherein the second and third piezoelectric elements are layered piezoelectric elements in which a piezoelectric element which generates a shear deformation in an inclined surface direction and a piezoelectric element which generates a shear deformation in the depth direction of the page surface are bonded.

5. A precise and high load resistance moving method according to claim 1, wherein the second piezoelectric element is formed of a layered piezoelectric element in which a piezoelectric element which generates a shear deformation in an inclined surface direction is bonded to a piezoelectric element which generates a shear deformation in a direction along the third axis and the fourth piezoelectric element is formed of a layered piezoelectric element in which a piezoelectric element which generates a shear deformation in the inclined surface direction which is bonded to a piezoelectric element which generates a shear deformation in the direction along the third axis.

6. A precise and high load resistance moving device comprising:
   (a) a piezoelectric element which generates a shear deformation is provided to a bottom surface of a wedge-shaped moving element which is placed on a base having wall surfaces to both sides and has a triangular shape in a cross section, and a piezoelectric element which generates a shear deformation in a depth direction of the page surface which is provided to each upper inclined surface of both sides of the wedge-shaped moving element, and
   (b) means in which by rapidly deforming and driving the piezoelectric element of the bottom surface of the wedge-shaped moving element, the wedge-shaped moving element is moved on the base, and by striking or extracting the wedge-shaped moving element to/from the two moving bodies of the right and left movable in the vertical direction and the depth direction of the page surface, a fine movement positioning of moving bodies in the lateral and vertical directions is performed so that a total of potential energy of the two moving bodies in the vertical direction is not changed, and further comprising means in which by rapidly deforming and driving the piezoelectric elements arranged to the upper inclined surface and generate the shear deformation in the depth direction of the page surface, a fine movement positioning of the moving bodies in the depth direction of the page surface is also performed.

7. A precise and high load resistance moving device comprising:

(a) a piezoelectric element which generates a shear deformation is provided to a bottom surface of a wedge-shaped moving element which is placed on a base having wall surfaces to both sides and has a triangular shape in a cross section, and a layered piezoelectric element in which a piezoelectric element which generates a shear deformation in an inclined surface direction and a piezoelectric element which generates a shear deformation in a depth direction of the page surface are bonded which is provided to each upper inclined surface of both sides of the wedge-shaped moving element, and (b) means in which by rapidly deforming and driving the piezoelectric elements which generate the shear deformation in the inclined surface direction out of the piezoelectric element of the bottom surface of the wedge-shaped moving element and the layered piezoelectric elements fixed to the upper inclined surfaces, the wedge-shaped moving element is moved on the base, and by striking or extracting the wedge-shaped moving element to/from two moving bodies of the right and left movable in the vertical direction and the depth direction of the page surface, a fine movement positioning of moving bodies in the lateral and vertical directions is performed so that a total of potential energy of the two moving bodies in the vertical direction is not changed, and further comprising means in which out of the layered piezoelectric elements arranged to the upper inclined surfaces, by rapidly deforming and driving the piezoelectric elements which generate the shear deformations in the depth direction of the page surface, a fine movement positioning of the moving bodies in the depth direction of the page surface is also performed.

* * * * *